(12) United States Patent
Kato

(10) Patent No.: US 8,902,510 B2
(45) Date of Patent: Dec. 2, 2014

(54) ZOOM LENS SYSTEM AND OPTICAL INSTRUMENT USING THE SAME

(75) Inventor: Koji Kato, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 87 days.

(21) Appl. No.: 13/482,207

(22) Filed: May 29, 2012

(65) Prior Publication Data

US 2012/0307379 A1  Dec. 6, 2012

(30) Foreign Application Priority Data

May 30, 2011  (JP) ................. 2011-120494

(51) Int. Cl.
| | | |
|---|---|---|
| *G02B 15/14* | (2006.01) | |
| *G02B 15/177* | (2006.01) | |
| *G02B 15/16* | (2006.01) | |
| *G02B 15/163* | (2006.01) | |

(52) U.S. Cl.
CPC ............ *G02B 15/177* (2013.01); *G02B 15/161* (2013.01); *G02B 15/163* (2013.01); *G02B 15/14* (2013.01)
USPC ............ 359/691; 359/676; 359/680; 359/689

(58) Field of Classification Search
CPC .... G02B 15/14; G02B 15/161; G02B 15/163; G02B 15/177
USPC ........................ 359/684, 689–692, 676, 680
See application file for complete search history.

(56) References Cited

U.S. PATENT DOCUMENTS

| | | | | |
|---|---|---|---|---|
| 6,809,882 B2 * | 10/2004 | Takatsuki | ...... | 359/691 |
| 6,943,958 B2 * | 9/2005 | Ozaki et al. | ...... | 359/680 |
| 7,362,509 B2 * | 4/2008 | Takeuchi | ...... | 359/679 |
| 7,576,921 B2 * | 8/2009 | Inoko | ...... | 359/649 |
| 7,933,075 B2 * | 4/2011 | Tomioka | ...... | 359/691 |
| 8,411,368 B2 * | 4/2013 | Miyazaki et al. | ...... | 359/686 |
| 2012/0147480 A1 * | 6/2012 | Fujisaki et al. | ...... | 359/691 |
| 2012/0218646 A1 * | 8/2012 | Kimura | ...... | 359/691 |
| 2012/0307374 A1 * | 12/2012 | Kato et al. | ...... | 359/684 |
| 2014/0118840 A1 * | 5/2014 | Enomoto | ...... | 359/687 |

FOREIGN PATENT DOCUMENTS

JP       2004-093593       3/2004

* cited by examiner

*Primary Examiner* — Thomas K Pham
*Assistant Examiner* — Nicholas Pasko
(74) *Attorney, Agent, or Firm* — Greenblum & Bernstein, P.L.C.

(57) ABSTRACT

A zoom lens system includes a negative first lens group and a positive second lens group, in that order from the object side, wherein upon zooming from the short focal length extremity to the long focal length extremity, the first lens group and the second lens group move in the optical axis direction while the distance therebetween mutually decreases. The first lens group includes a negative first sub-lens group and a positive second sub-lens group, in that order from the object side, wherein the second sub-lens group constitutes a focusing lens group that is moved in the optical axis direction during a focusing operation.

9 Claims, 38 Drawing Sheets

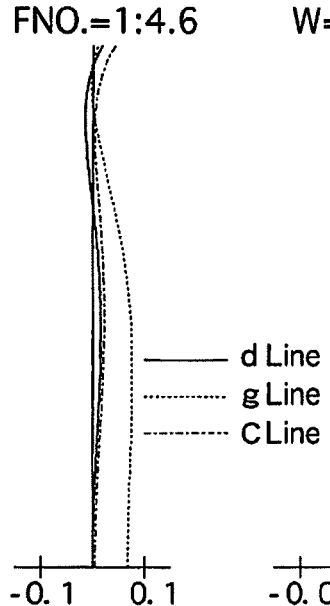
Fig. 2A
FNO.=1:4.6
— d Line
······ g Line
—·—· C Line
-0.1   0.1
SPHERICAL
ABERRATION
CHROMATIC
ABERRATION
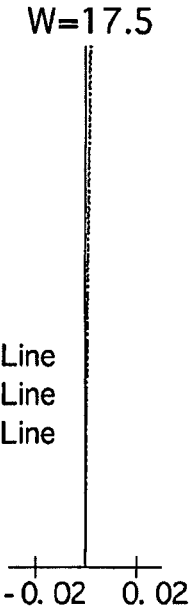
Fig. 2B
W=17.5
-0.02  0.02
LATERAL
CHROMATIC
ABERRATION
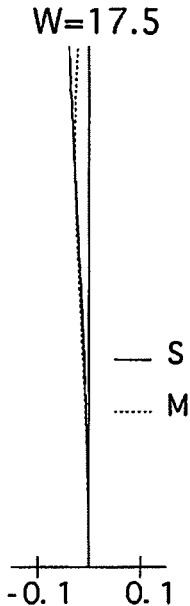
Fig. 2C
W=17.5
— S
······ M
-0.1   0.1
ASTIGMATISM
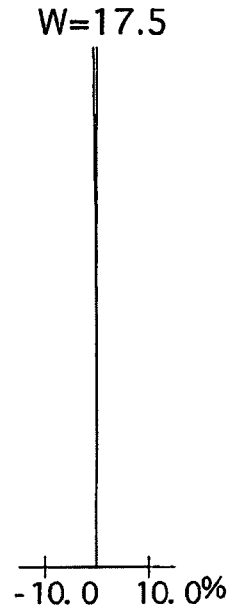
Fig. 2D
W=17.5
-10.0  10.0%
DISTORTION
Fig. 3A
Y= 0.00
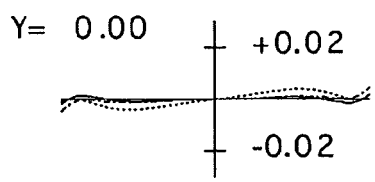
+0.02
-0.02
Fig. 3B
Y= 2.30
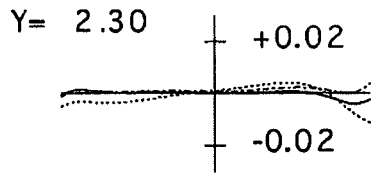
+0.02
-0.02
Fig. 3C
Y= 3.25
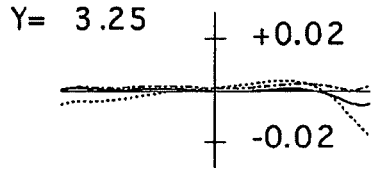
+0.02
-0.02
Fig. 3D
Y= 4.65
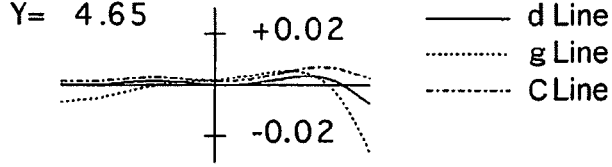
+0.02
-0.02
— d Line
······ g Line
—·—· C Line

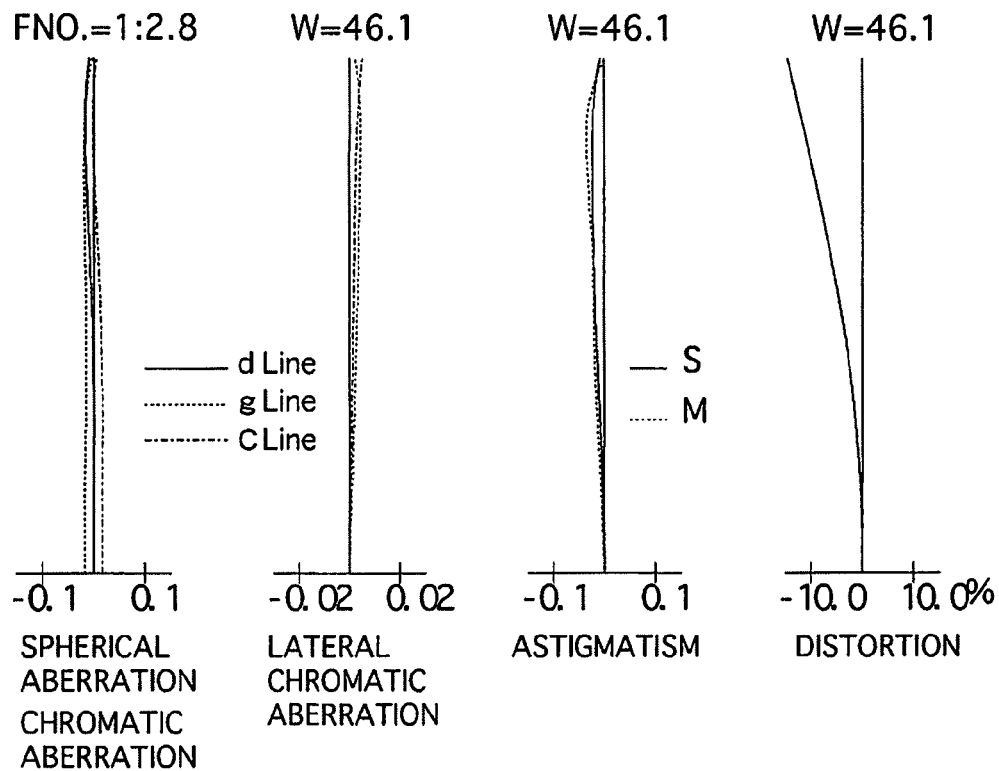
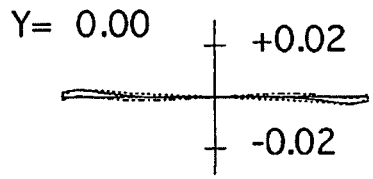
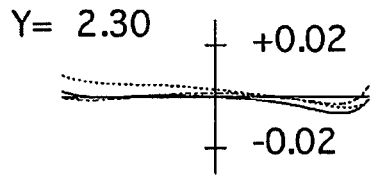
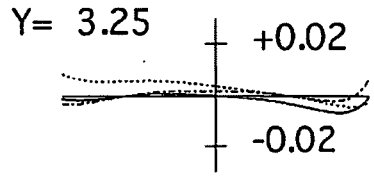
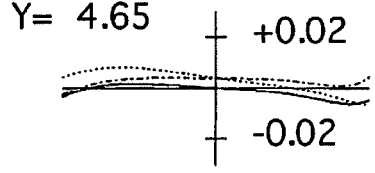

FNO.=1:4.5

— d Line
······ g Line
—·— C Line

-0.1  0.1
SPHERICAL ABERRATION
CHROMATIC ABERRATION

W=17.5

-0.02  0.02
LATERAL CHROMATIC ABERRATION

W=17.5

— S
······ M

-0.1  0.1
ASTIGMATISM

W=17.5

-10.0  10.0%
DISTORTION

Y= 0.00   +0.02 / -0.02

Y= 2.30   +0.02 / -0.02

Y= 3.25   +0.02 / -0.02

Y= 4.65   +0.02 / -0.02

— d Line
······ g Line
—·— C Line

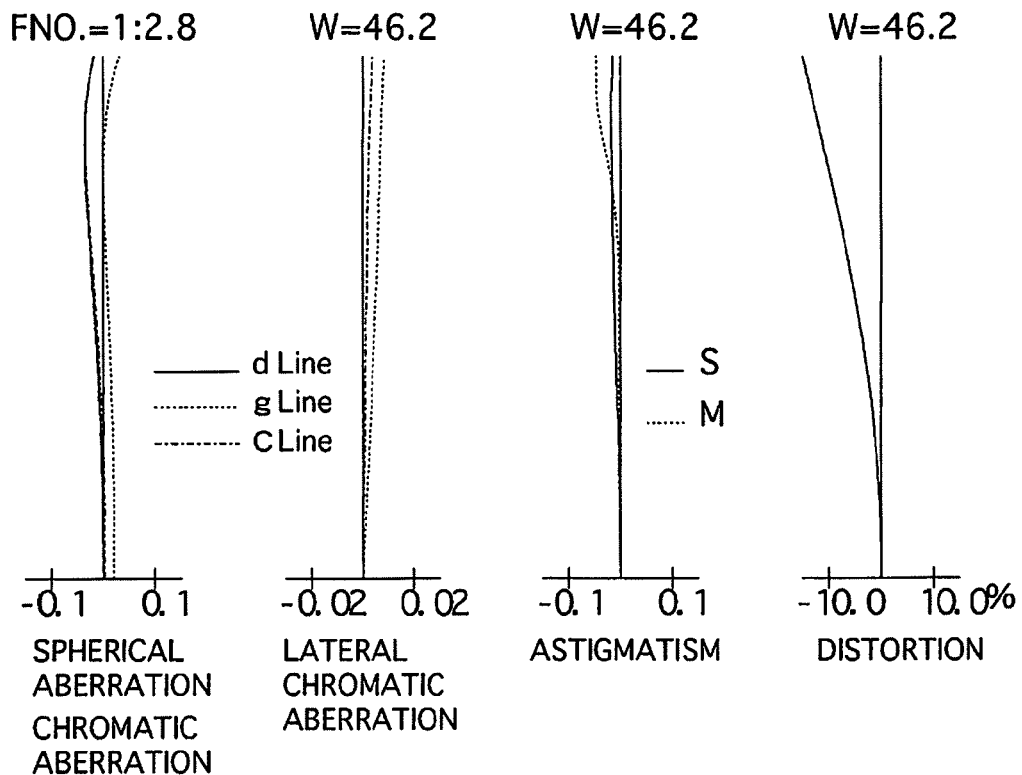
Fig. 11A   Fig. 11B   Fig. 11C   Fig. 11D
Fig. 11A: FNO.=1:2.8, SPHERICAL ABERRATION CHROMATIC ABERRATION (d Line, g Line, C Line)
Fig. 11B: W=46.2, LATERAL CHROMATIC ABERRATION
Fig. 11C: W=46.2, ASTIGMATISM (S, M)
Fig. 11D: W=46.2, DISTORTION
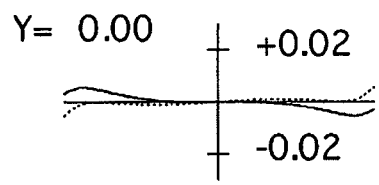
Fig. 12A   Y= 0.00
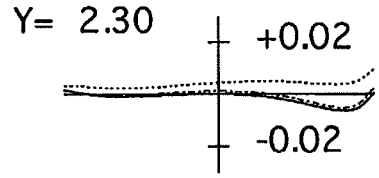
Fig. 12B   Y= 2.30
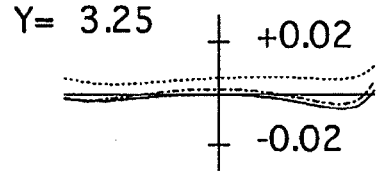
Fig. 12C   Y= 3.25
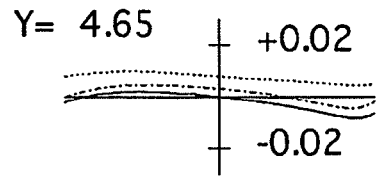
Fig. 12D   Y= 4.65 (d Line, g Line, C Line)

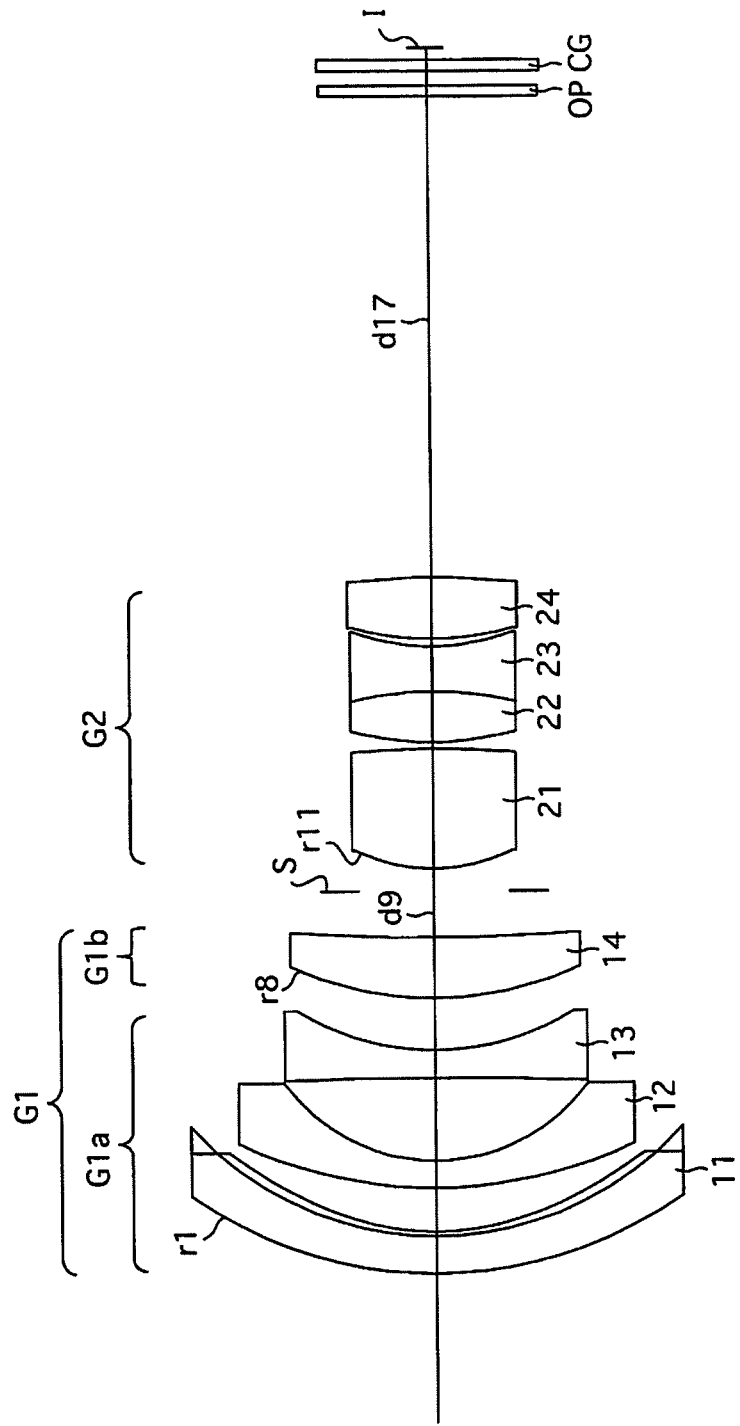

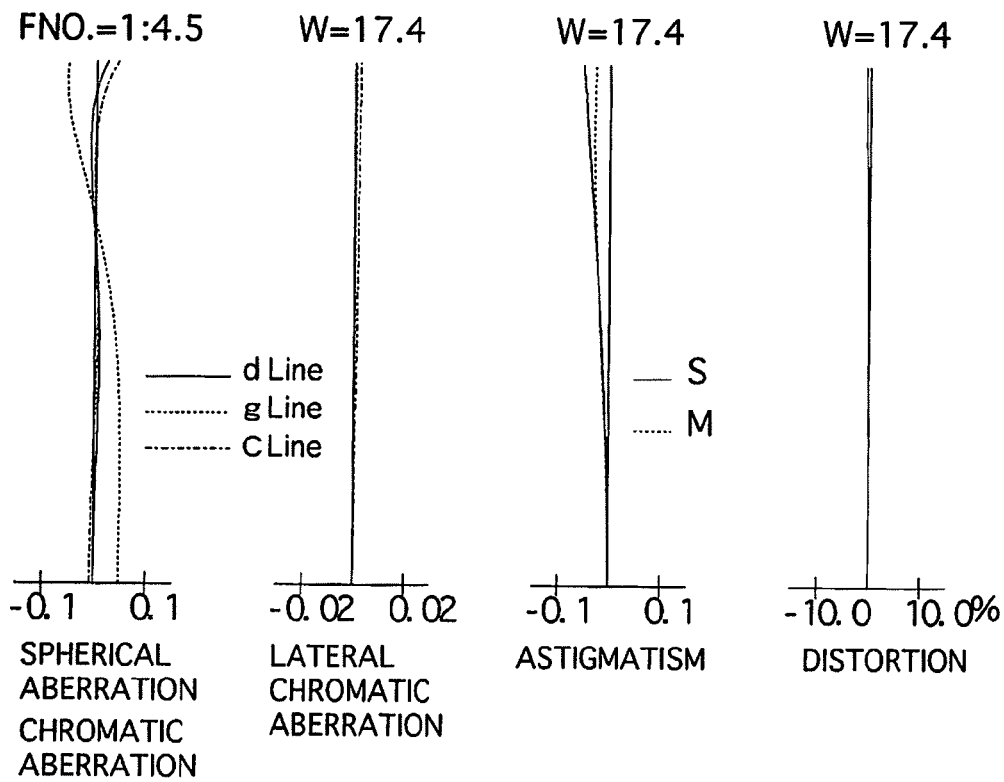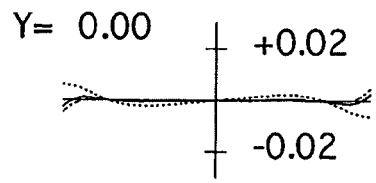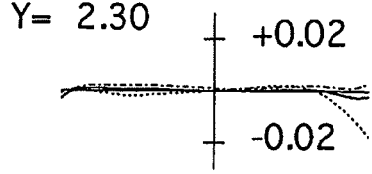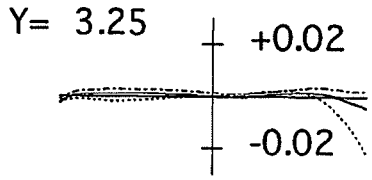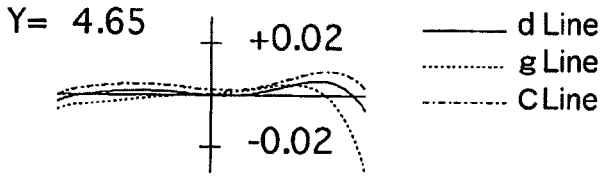

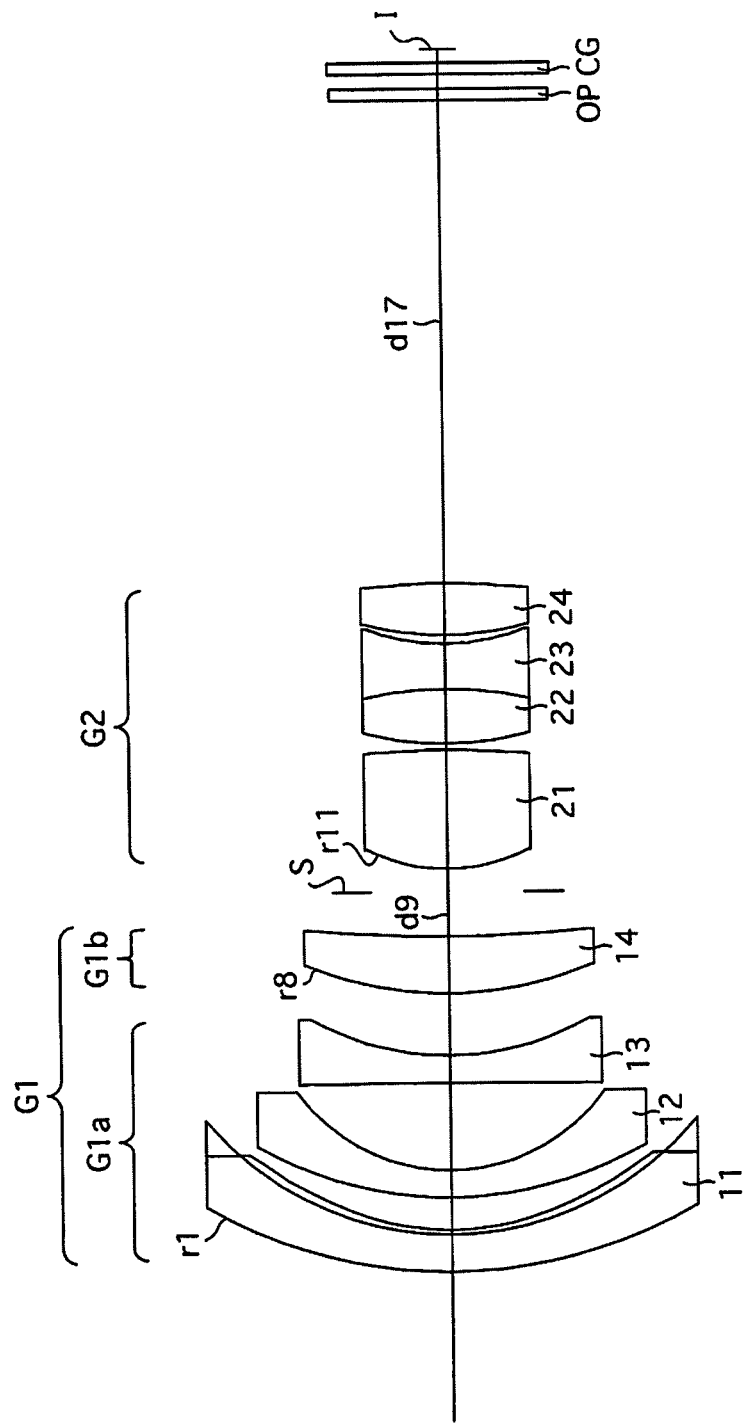

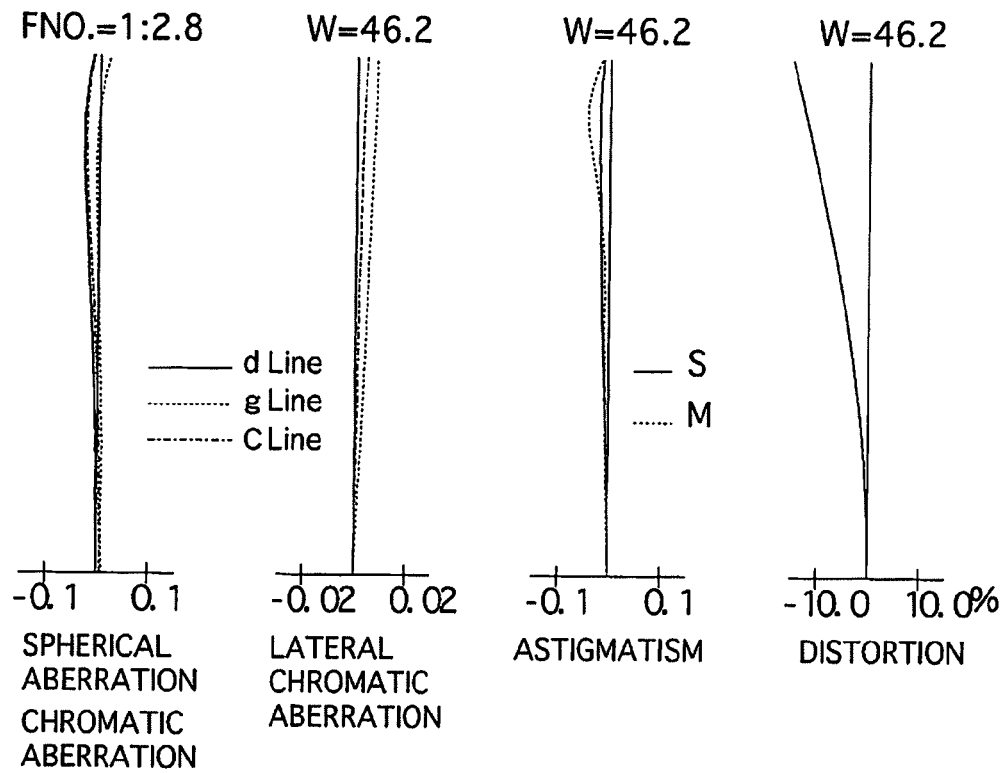
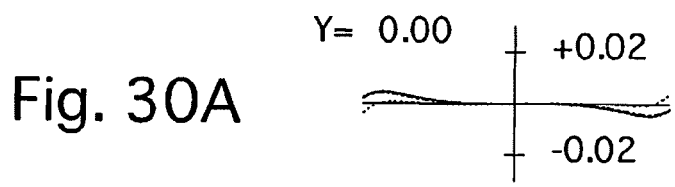
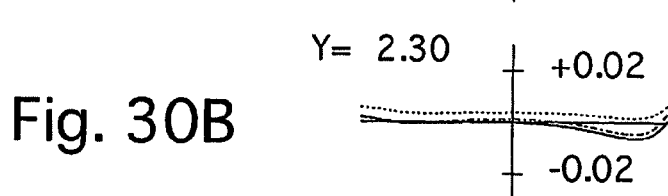
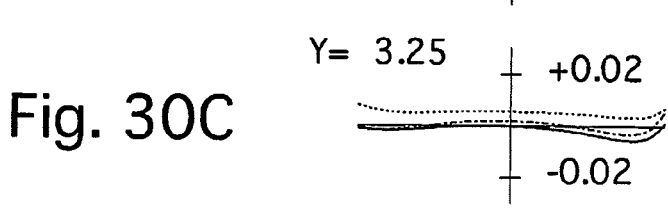
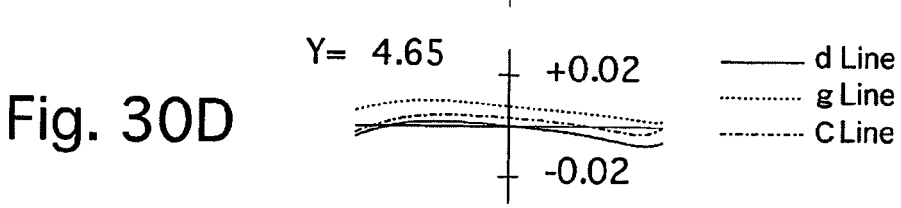

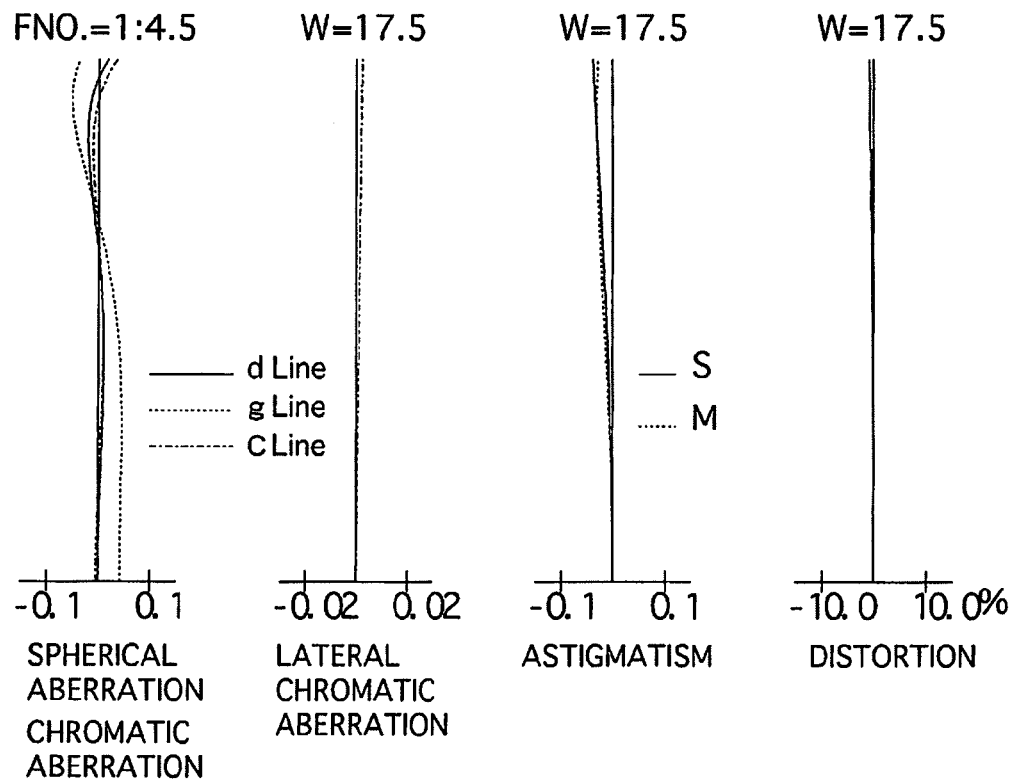
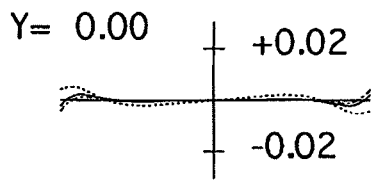
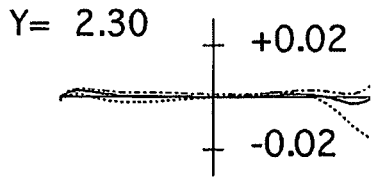
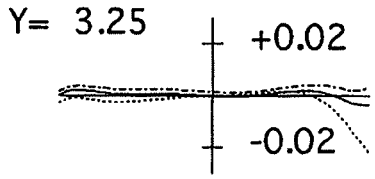
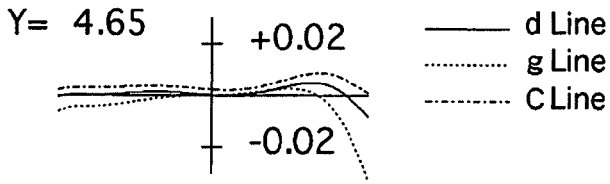

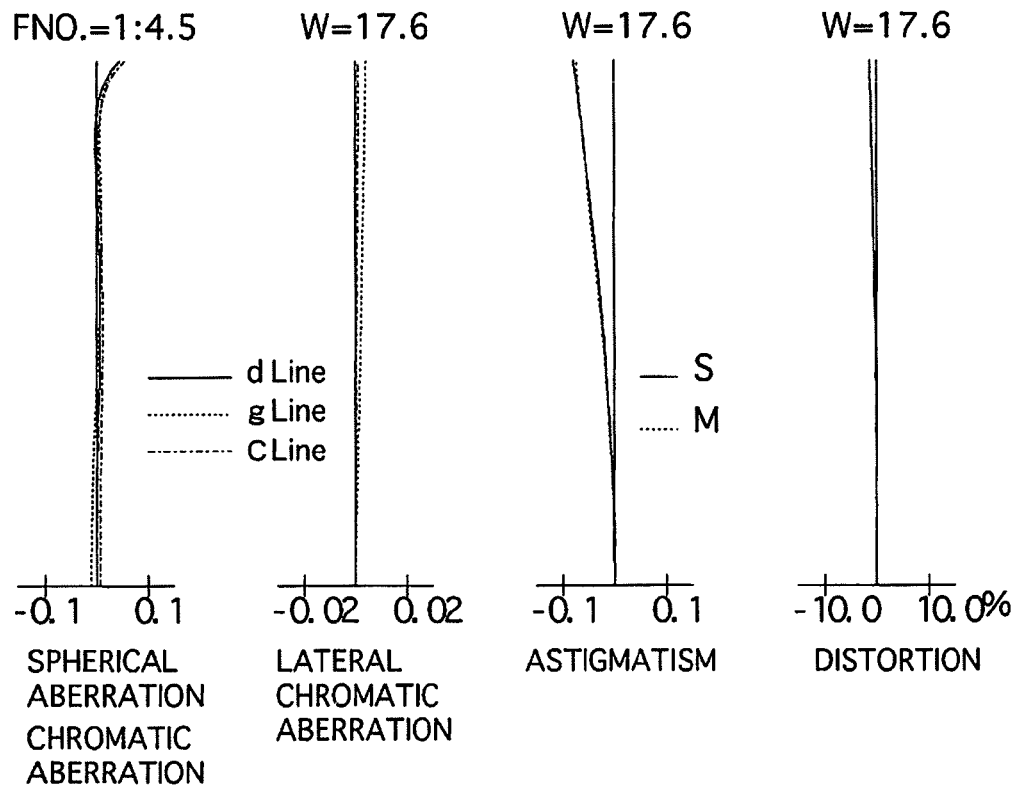
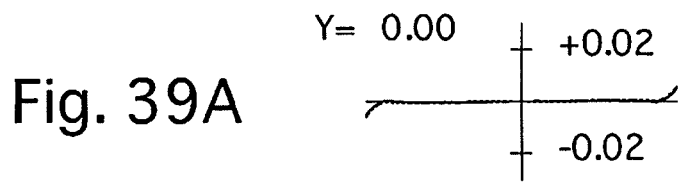
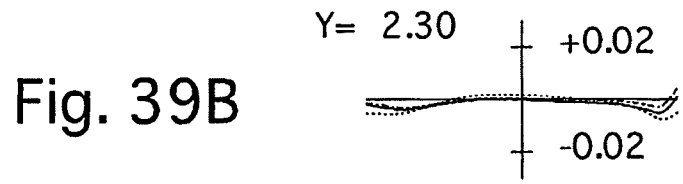
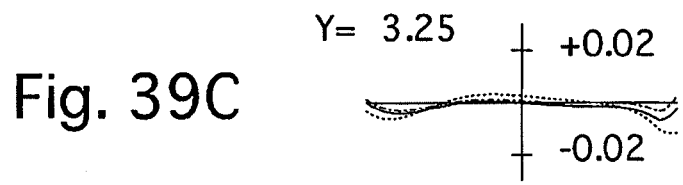
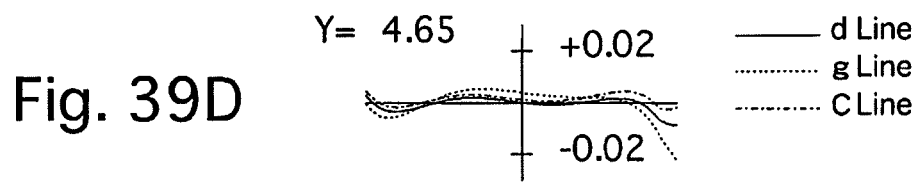

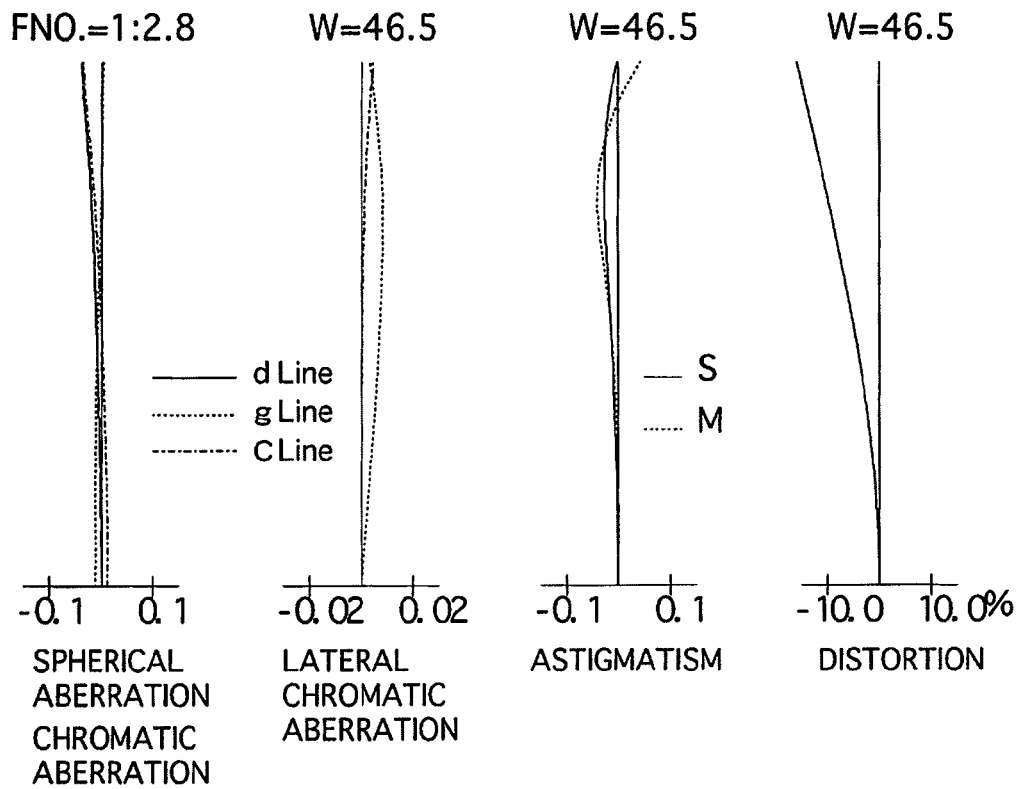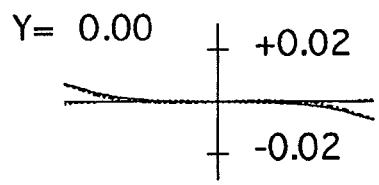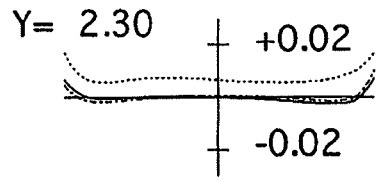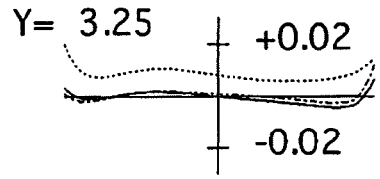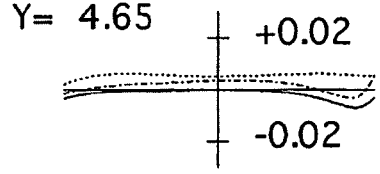

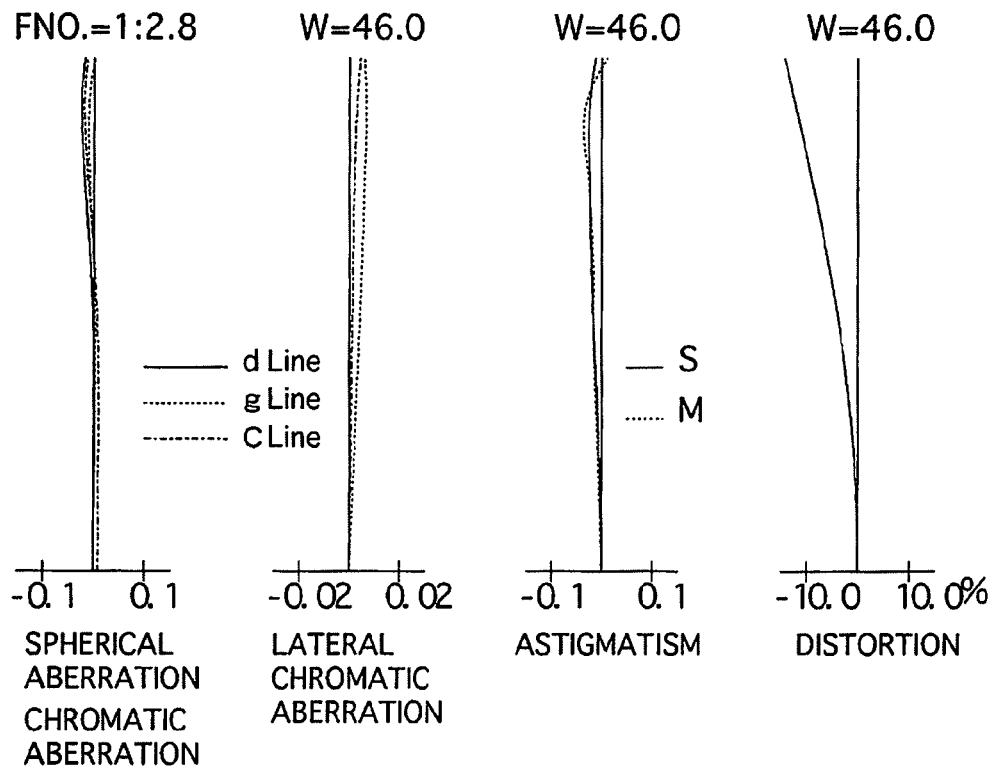
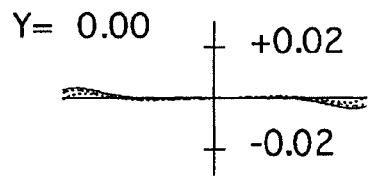
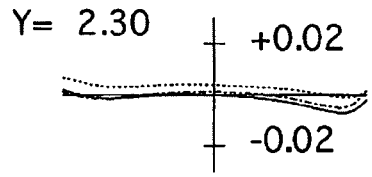
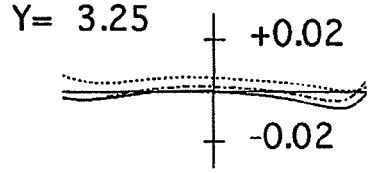
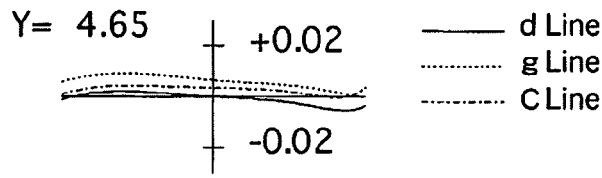

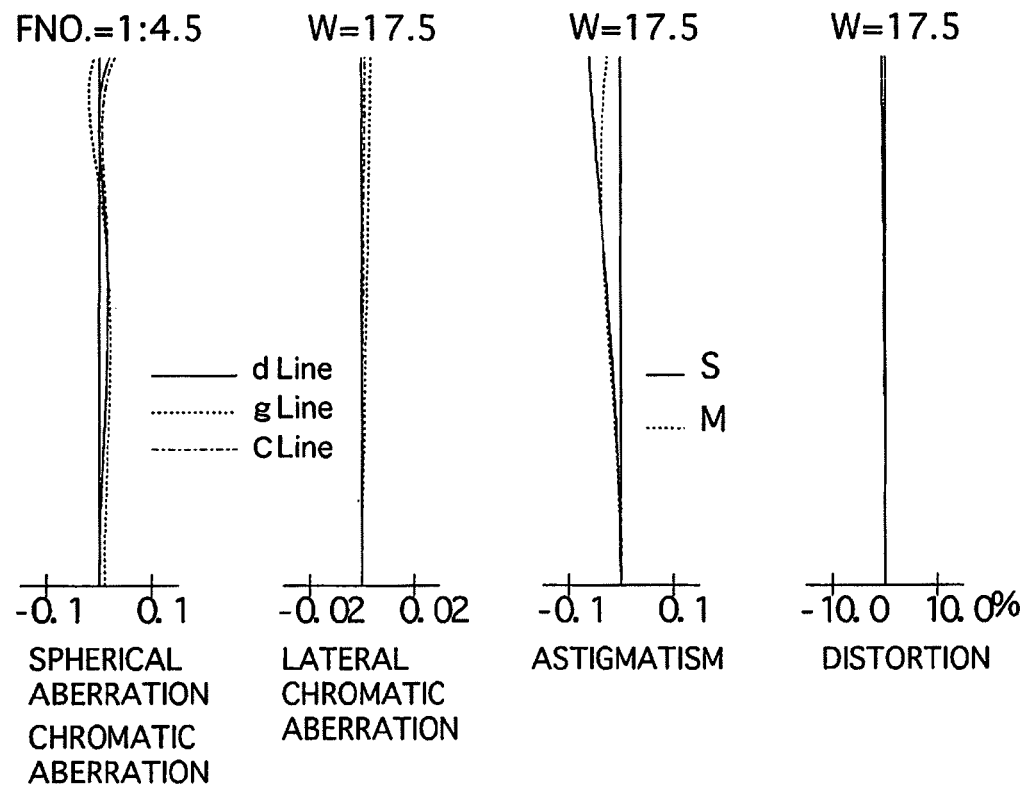
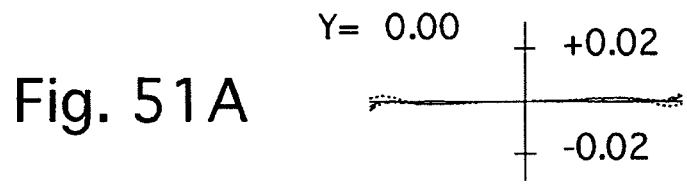
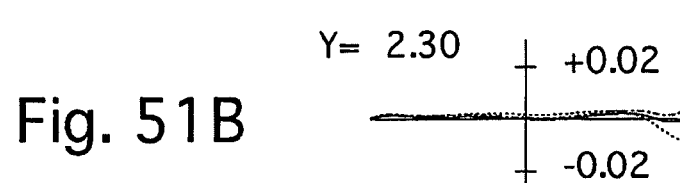
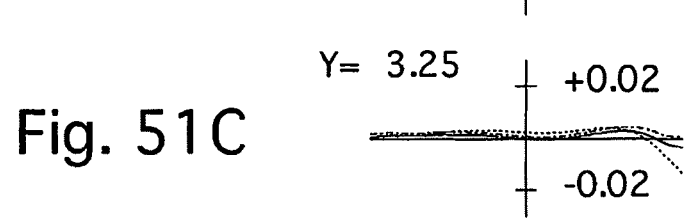
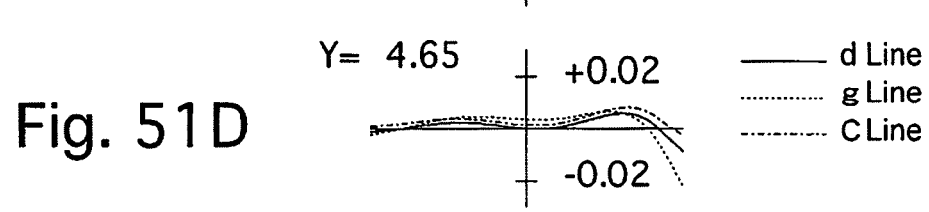

ZOOM LENS SYSTEM AND OPTICAL INSTRUMENT USING THE SAME

BACKGROUND OF THE INVENTION

1. Field of the Invention

The present invention relates to a zoom lens system that is suitable for use in an optical instrument such as a digital camera, etc.

2. Description of Related Art

In recent years there has been an increasing need for a zoom lens system in an optical instrument such as a digital camera, etc., to be more compact (miniaturized) and to have a higher optical quality. There is also a very strong demand for miniaturization of the focusing mechanism system and for a rapid focusing operation.

Zoom lens systems configured of a negative first lens group and a positive second lens group, in that order from the object side, are known in the art. A so-called front focusing method, in which the entire first lens group is moved along the optical axis to carry out a focusing operation, is a typical focusing method that is used in such a type of zoom lens system.

However, in such a front focusing method, if the weight of the first lens group, which constitutes a focusing lens group, is large (if the number of lens elements in the first lens group is large), the motor/actuator that constitutes the focusing mechanism system is also enlarged. Accordingly, the diameter of the lens barrel (which includes the zoom lens system of the present invention and the motor/actuator) is enlarged, thereby enlarging the entire zoom lens system.

Japanese Unexamined Patent Publication No. 2004-93593 discloses a zoom lens system configured of a negative first lens group and a positive second lens group, in that order from the object side, in which the two lens elements provided on the image side within the first lens group are used as a focusing lens group.

However, the burden on the focusing mechanism system such as the motor/actuator still remains great, so that such a focusing mechanism system cannot adequately cope with rapid focusing operations.

SUMMARY OF THE INVENTION

The present invention, in view of the above-discussed problems, provides a zoom lens system which is compact (miniaturized), has a superior optical quality, achieves miniaturization of the focusing mechanism system, and achieves a rapid focusing operation; the present invention also provides an optical instrument which uses such a zoom lens system.

According to an aspect of the present invention, a zoom lens system is provided, including a negative first lens group and a positive second lens group, in that order from the object side, wherein upon zooming from the short focal length extremity to the long focal length extremity, the first lens group and the second lens group move in the optical axis direction while the distance therebetween mutually decreases. The first lens group includes a negative first sub-lens group and a positive second sub-lens group, in that order from the object side, wherein the second sub-lens group constitutes a focusing lens group that is moved in the optical axis direction during a focusing operation.

It is desirable for the second sub-lens group to include a positive single lens element.

It is desirable for the following condition (1) to be satisfied:

$$-1 < SF < 0 \tag{1},$$

wherein $SF=(br1-br2)/(br1+br2)$, $br1$ designates the radius of curvature of the surface on the object side of the positive single lens element of the second sub-lens group, and $br2$ designates the radius of curvature of the surface on the image side of the positive single lens element of the second sub-lens group.

It is further desirable for the following condition (1') to be satisfied:

$$-0.85 < SF < -0.40 \tag{1'}.$$

It is desirable for the following condition (2) to be satisfied:

$$-5.0 < f1b/f1a < -3.5 \tag{2},$$

wherein $f1b$ designates the focal length of the second sub-lens group, and $f1a$ designates the focal length of the first sub-lens group.

It is desirable for the first sub-lens group to include three negative lens elements which each has a concave surface on the image side. For example, a negative lens element having a concave surface on the image side can refer to a negative meniscus lens element having a concave surface on the image side or a biconcave negative lens element.

It is desirable for the following condition (3) to be satisfied:

$$-3.5 < fL1/(fL2 \cdot fL3)^{1/2} < -1.0 \tag{3},$$

wherein $fL1$ designates the focal length of the first negative lens element that is provided within the first sub-lens group, in that order from the object side, $fL2$ designates the focal length of the second negative lens element that is provided within the first sub-lens group, in that order from the object side, and $fL3$ designates the focal length of the third negative lens element that is provided within the first sub-lens group, in that order from the object side.

It is desirable for an aspherical surface to be provided on at least one of the three negative lens elements of the first sub-lens group.

It is desirable for the negative lens element that is provided closest to the object side within the first sub-lens group to be a hybrid including a glass lens element having a compound resin layer bonded to the image side thereof.

Alternatively, it is desirable for an aspherical surface to be provided on the second negative lens element that is provided within the first sub-lens group, in that order from the object side.

It is desirable for at least one aspherical-surfaced lens element to be provided in each of the first lens group and the second lens group.

It is desirable for the second lens group to include at least three positive lens elements.

It is desirable for the air-distance between the first sub-lens group and the second sub-lens group to remain unchanged during zooming from the short focal length extremity to the long focal length extremity (in which the first sub-lens group and the second sub-lens group integrally move in the optical axis direction during zooming).

It is desirable for a diaphragm to be provided between the first lens group and the second lens group.

In an embodiment, an optical instrument is provided, including an image sensor that electronically converts an image that is formed through the above-described zoom lens system.

According to the present invention, a zoom lens system is achieved which is compact (miniaturized), has a superior optical quality, achieves miniaturization of the focusing mechanism system, and achieves a rapid focusing operation; the present invention also provides an optical instrument which uses such a zoom lens system.

The present disclosure relates to subject matter contained in Japanese Patent Application No. 2011-120494 (filed on May 30, 2011) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1;

FIGS. 3A, 3B, 3C and 3D show lateral aberrations that occurred in the lens arrangement shown in FIG. 1;

FIGS. 5A, 5B, 5C and 5D show various aberrations that occurred in the lens arrangement shown in FIG. 4;

FIGS. 6A, 6B, 6C and 6D show lateral aberrations that occurred in the lens arrangement shown in FIG. 4;

FIGS. 11A, 11B, 11C and 11D show various aberrations that occurred in the lens arrangement shown in FIG. 10;

FIGS. 12A, 12B, 12C and 12D show lateral aberrations that occurred in the lens arrangement shown in FIG. 10;

FIG. 13 shows a lens arrangement of a third numerical embodiment of a zoom lens system, according to the present invention, at the long focal length extremity when focused on an object at infinity;

FIGS. 14A, 14B, 14C and 14D show various aberrations that occurred in the lens arrangement shown in FIG. 13;

FIGS. 15A, 15B, 15C and 15D show lateral aberrations that occurred in the lens arrangement shown in FIG. 13;

FIG. 25 shows a lens arrangement of a fifth numerical embodiment of a zoom lens system, according to the present invention, at the long focal length extremity when focused on an object at infinity;

FIGS. 29A, 29B, 29C and 29D show various aberrations that occurred in the lens arrangement shown in FIG. 28;

FIGS. 30A, 30B, 30C and 30D show lateral aberrations that occurred in the lens arrangement shown in FIG. 28;

FIGS. 32A, 32B, 32C and 32D show various aberrations that occurred in the lens arrangement shown in FIG. 31;

FIGS. 33A, 33B, 33C and 33D show lateral aberrations that occurred in the lens arrangement shown in FIG. 31;

FIGS. 38A, 38B, 38C and 38D show various aberrations that occurred in the lens arrangement shown in FIG. 37;

FIGS. 39A, 39B, 39C and 39D show lateral aberrations that occurred in the lens arrangement shown in FIG. 37;

FIGS. 41A, 41B, 41C and 41D show various aberrations that occurred in the lens arrangement shown in FIG. 40;

FIGS. 42A, 42B, 42C and 42D show lateral aberrations that occurred in the lens arrangement shown in FIG. 40;

FIGS. 47A, 47B, 47C and 47D show various aberrations that occurred in the lens arrangement shown in FIG. 46;

FIGS. 48A, 48B, 48C and 48D show lateral aberrations that occurred in the lens arrangement shown in FIG. 46;

FIGS. 50A, 50B, 50C and 50D show various aberrations that occurred in the lens arrangement shown in FIG. 49;

FIGS. 51A, 51B, 51C and 51D show lateral aberrations that occurred in the lens arrangement shown in FIG. 49;

DESCRIPTION OF THE EMBODIMENTS

Figure 55:
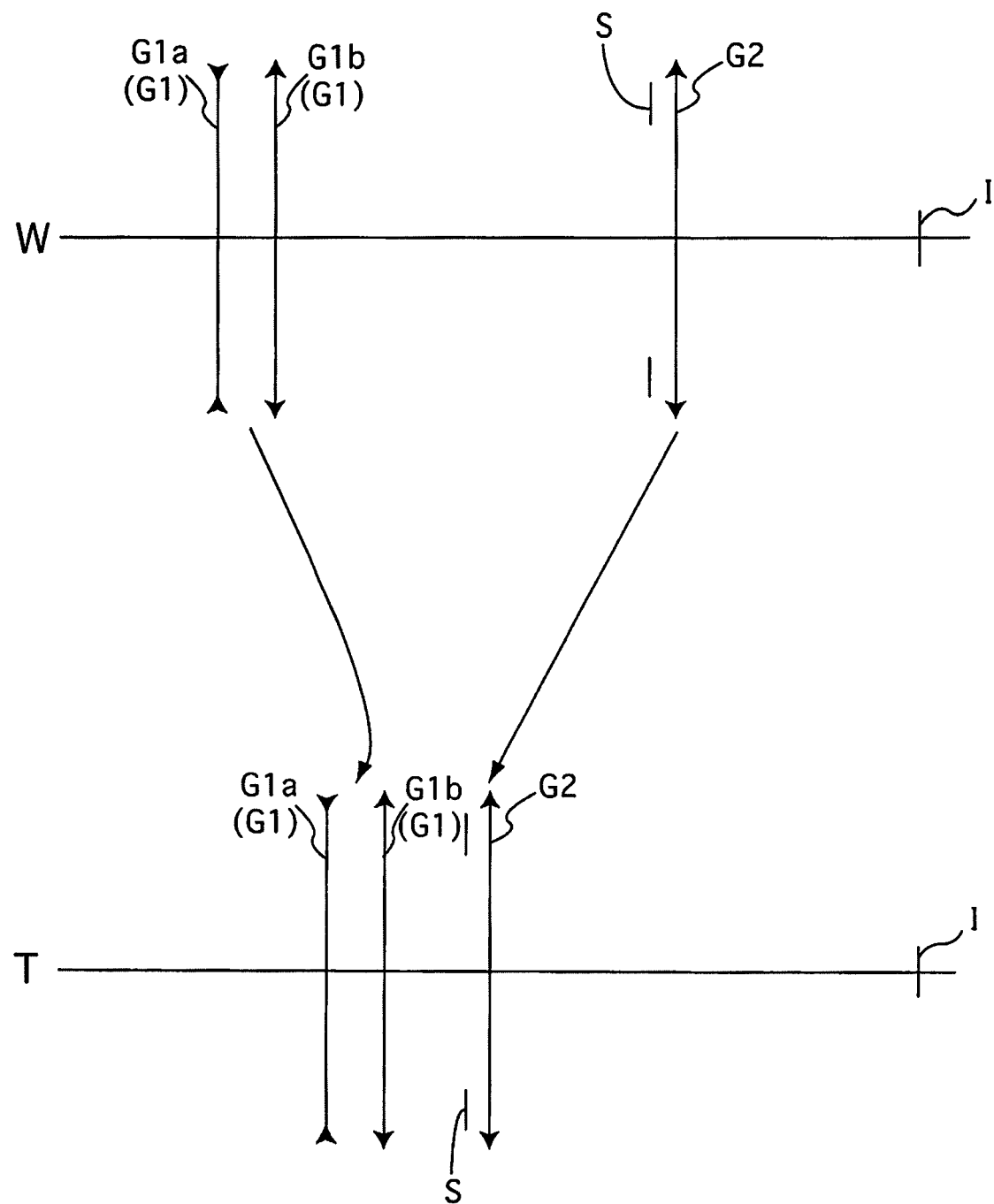
FIG. 55 shows a zoom path of the zoom lens system according to the present invention.
Figure 56:
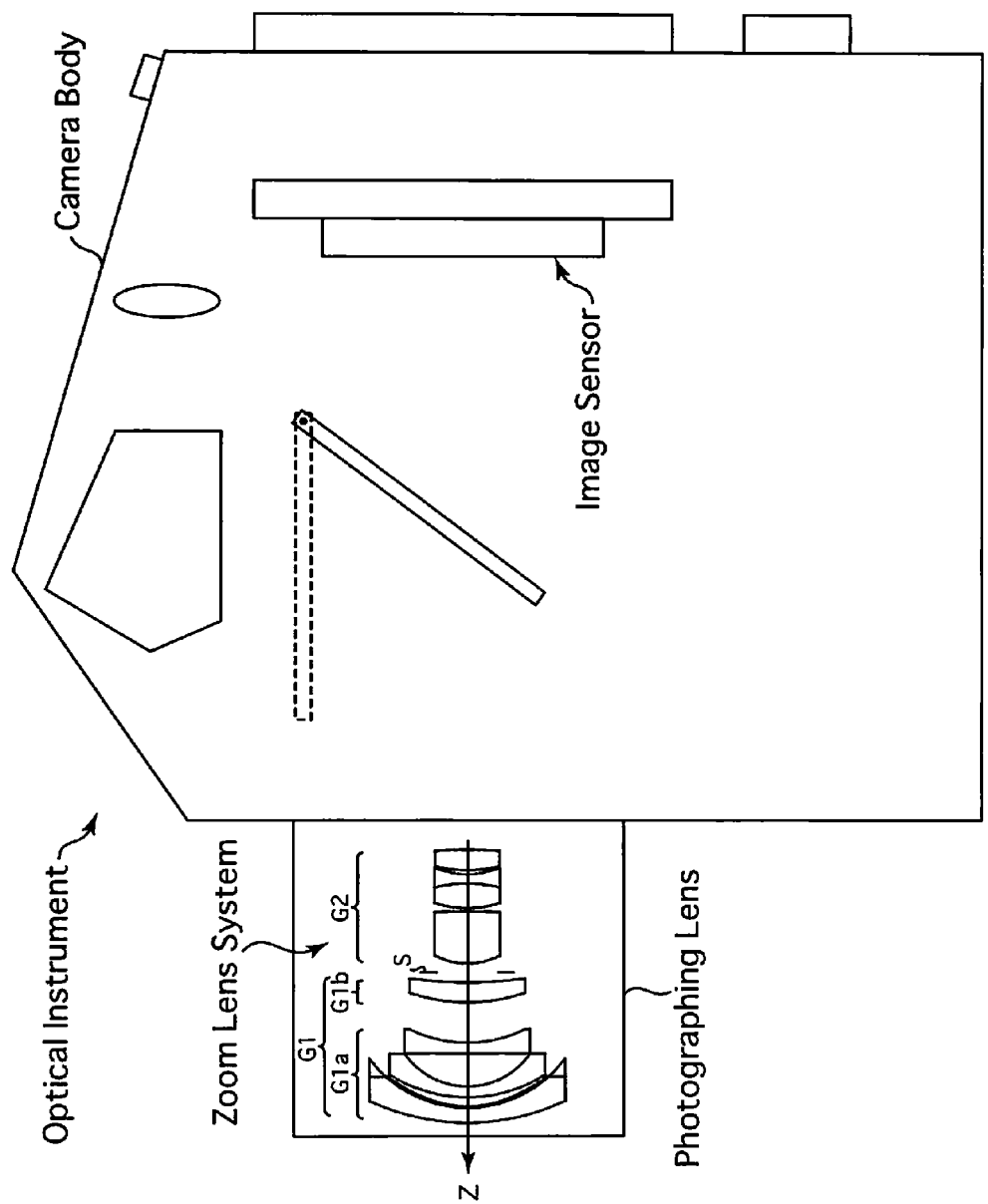
FIG. 56 shows an optical instrument including an image sensor that electronically converts an image that is formed through the zoom lens system of the present invention into a signal.

The zoom lens system of the illustrated embodiments, as shown in the zoom path of FIG. 55, is configured of a negative first lens group G1, and a positive second lens group G2, in that order from the object side. The first lens group G1 is configured of a negative first sub-lens group G1a and a positive second sub-lens group G1b, in that order from the object side. A diaphragm S which is provided between the second sub-lens group G1b (of the first lens group G1) and the second lens group G2 moves integrally with the second lens group G2 along the optical axis direction. 'I' designates the imaging plane.

In the zoom lens system of the present invention, upon zooming from the short focal length extremity (W) to the long focal length extremity (T), the distance between the first lens group G1 and the second lens group G2 decreases. Upon zooming from the short focal length extremity (W) to the long focal length extremity (T), the air-distance between the first sub-lens group G1a and the second sub-lens group G1b does not change (the first sub-lens group G1a and the second sub-lens group G1b integrally move in the optical axis direction).

More specifically, upon zooming from the short focal length extremity (W) to the long focal length extremity (T), the first lens group G1 (the first sub-lens group G1a and the second sub-lens group G1b) first moves toward the image side and thereafter moves by a slight amount toward the object side (thereby moving toward the image side as a whole), and the second lens group G2 moves monotonically toward the object side.

In each of the first through ninth numerical embodiments, the first sub-lens group G1a is configured of three negative lens elements (negative lens elements each having a concave surface on the image side) 11, 12 and 13, in that order from the object side. In each of the first through sixth, eighth and ninth numerical embodiments, the negative lens element 11 that is provided closest to the object side is formed as a hybrid lens configured of a glass lens element having an aspherical layer, formed by a compound resin material, bonded to the image side thereof; in the seventh numerical embodiment, the negative lens element 11 is a spherical lens element (i.e., is not a hybrid lens). In each of the first through sixth, eighth and ninth numerical embodiments, the second negative lens element 12 from the object side is a spherical lens element; in the seventh numerical embodiment, the second negative lens element 12 from the object side has an aspherical surface on each side thereof.

In each of the first through ninth numerical embodiments, the second sub-lens group G1b is configured of a positive single lens element 14. The positive single lens element (second sub-lens group G1b) 14 constitutes a focusing lens group which is moved in the optical axis direction during a focusing operation. Namely, when focusing on an object at infinity through to an object at a finite distance, focusing is carried out by moving the positive single lens element 14 toward the image side.

In each of the first through sixth and eighth numerical embodiments, the second lens group G2 is configured of a positive lens element 21, a cemented lens formed from a positive lens element 22 and a negative lens element 23; and a positive lens element 24, in that order from the object side. Each of the positive lens elements 21 and 24 has an aspherical surface on each side thereof.

In each of the seventh and ninth numerical embodiments, the second lens group G2 is configured of a positive lens element 21', a positive lens element 22', a cemented lens formed from a positive lens element 23' and a negative lens element 24'; and a positive lens element 25', in that order from the object side. Each of the positive lens elements 22' and 25' has an aspherical surface on each side thereof.

In the illustrated embodiments, in order to achieve a negative refractive power in the zoom lens system while suppressing occurrence of distortion, the first lens group G1 is configured of the first sub-lens group G1a, which is configured of the three negative lens elements (negative lens elements each having a concave surface on the image side) 11, 12 and 13; and the second sub-lens group G1b which is configured of the positive single lens element 14.

In order to suppress distortion, it is effective to provide a positive lens element (having a convex surface on the object side) at a location that is closest to the object side within the first lens group. However, if such a positive lens element (having a convex surface on the object side) is provided at a location that is closest to the object side, the maximum diameter of the first lens group becomes too large, thereby increasing the overall size of the entire zoom lens system.

Therefore, in the illustrated embodiments, by arranging the first sub-lens group G1a so as to be configured of the three negative lens elements 11, 12 and 13, and by including a lens element (aspherical-surface lens element) that has at least one aspherical surface within the first sub-lens group G1a, enlargement of the first lens group G1 can be prevented, and occurrence of distortion can be successfully suppressed.

From a viewpoint of cost, it is advantageous for the aspherical-surface lens element within the first sub-lens group G1a to be located closest to the image side so as to have the smallest diameter (i.e., the negative lens element 13); however, there is, nevertheless, the disadvantage of aberration correction being insufficient since the lens diameter (of the aspherical-surface lens element) is small.

To solve this problem, the illustrated embodiments achieve favorable aberration correction by configuring the negative lens element 11 that is provided closest to the object side within the first sub-lens group G1a or the second negative lens element 12 from the object side within the first sub-lens group G1a as the aspherical-surface lens element. In the case where the negative lens element 11 that is provided closest to the object side within the first sub-lens group G1a is configured as the aspherical-surface lens element, in view of the manufacturing costs, it is desirable to form the negative lens element 11 as a hybrid lens configured of a glass lens element having an aspherical layer, formed by a compound resin material, bonded to the image side thereof. If the aspherical surface (of the negative lens element 11) that is included within the first sub-lens group G1a is formed such that the negative refractive power thereof increasingly weakens (the positive refractive power increasingly strengthens) from the optical axis toward the outer periphery compared to the paraxial spherical surface thereof, positive distortion occurs at this aspherical surface to thereby favorably correct the negative distortion that prominently occurs at the first lens group G1.

The positive single lens element 14 of the second sub-lens group G1b constitutes a focusing lens group that is moved in the optical axis direction during a focusing operation, and also functions to prevent fluctuation in distortion, spherical aberration and coma during a focusing operation. By arranging the focusing lens group so as to be configured of the positive single lens element 14, the weight of the focusing lens group can be reduced, the motor/actuator that constitutes the focusing mechanism system can be miniaturized. Accordingly, the maximum diameter of the lens barrel (which includes the zoom lens system of the present invention) can be reduced and the entire zoom lens system can also be miniaturized. Moreover, a rapid focusing operation can also be achieved.

If the shape of the positive single lens element 14 is formed as a meniscus shape having a convex surface on the object side, abaxial astigmatism at the short focal length extremity can be favorably corrected.

In the illustrated embodiments, by including at least one negative lens element (the negative lens element 23 or the negative lens element 24'), which generates negative spherical aberration, within the second lens group G2, spherical aberrations that occur over the entire zoom lens system can be favorably corrected while retaining a minimal influence on the abaxial aberration. Furthermore, by including at least three positive lens elements (the positive lens elements 21, 22 and 24, or the positive lens elements 21', 22', 23' and 25') within the second lens group G2, occurrence of spherical aberration and coma can be suppressed. Furthermore, by bonding the negative lens element provided within the second lens group G2 with one positive lens element (i.e., bonding the positive lens element 22 with the negative lens element 23, or bonding the positive lens element 23' with the negative lens element 24'), high-order spherical aberrations can also be favorably corrected.

Condition (1) and (1') specify the shape factor of the positive single lens element 14 when the second sub-lens group G1b (i.e., the focusing lens group) is configured of the positive single lens element 14. By forming the positive single lens element 14 so as to have a positive meniscus shape, having a convex surface on the object side, that satisfies condition (1) or (1'), abaxial astigmatism at the short focal length extremity can be favorably corrected; coma, astigmatism and field curvature during a focusing operation can be favorably corrected; and a favorable balance of aberration fluctuations over the entire zoom lens system can be maintained when a focusing operation is carried out.

If the upper limit of condition (1) is exceeded, the difference between the radius of curvature of the surface on the object side of the positive single lens element 14 and the radius of curvature of the surface on the image side of the positive single lens element 14 becomes substantially zero (0), so that it becomes difficult to suppress coma fluctuations during a focusing operation.

If the lower limit of condition (1) is exceeded, the positive single lens element 14, which constitutes the focusing lens group, becomes a planoconvex positive lens element having a convex surface on the object side, and it becomes difficult to suppress the astigmatism fluctuations during a focusing operation. Moreover, correction of the field curvature becomes insufficient.

Condition (2) specifies the ratio of the focal length of the second sub-lens group G1b (focusing lens group, i.e., the positive single lens element 14) to the focal length of the first sub-lens group G1a. By satisfying condition (2), various aberrations such as spherical aberration, coma, distortion and astigmatism can be favorably corrected.

If the upper limit of condition (2) is exceeded, the refractive power of the second sub-lens group G1b (the focusing lens group) becomes too strong, which although has the advantage of reducing the amount of movement of the second sub-lens group G1b toward the close-distance side, it becomes difficult to correct spherical aberration and coma at the long focal length extremity.

If the lower limit of condition (2) is exceeded, the refractive power of the first sub-lens group G1a becomes too strong, so that it becomes difficult to correct distortion and astigmatism.

Condition (3) specifies the balance of refractive power between the three negative lens elements 11, 12 and 13 of the first sub-lens group G1a. By satisfying condition (3), the entire zoom lens system can be made more compact (miniaturized) by reducing the diameter of the first lens group G1, the cost of the glass lens material can be reduced, and astigmatism and distortion at the short focal length extremity can be favorably corrected.

If the upper limit of condition (3) is exceeded, the refractive power of the negative lens element 11 within the first sub-lens group G1a becomes too strong, so that the radius of curvature of the negative lens element 11 is decreased, thereby increasing the cost of the glass material thereof. Moreover, correction of astigmatism at the short focal length extremity becomes difficult.

If the lower limit of condition (3) is exceeded, the refractive power of the negative lens element 11 within the first sub-lens group G1a becomes too weak, so that the entire zoom lens system is enlarged due to the diameter of the first lens group G1 increasing in size. Moreover, correction of distortion at the short focal length extremity becomes difficult.

Specific first through ninth numerical embodiments of the zoom lens system according to the present invention will be herein discussed. In the various aberration diagrams, lateral aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
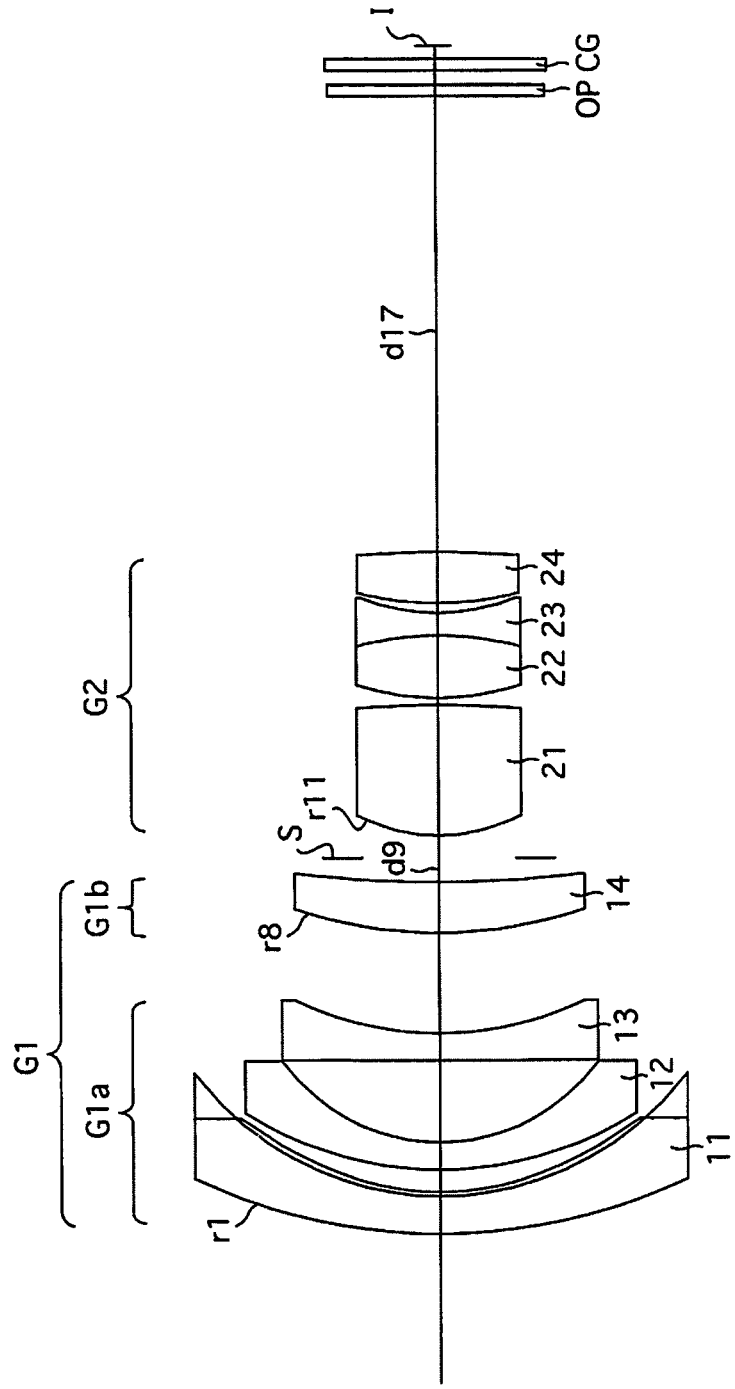
FIG. 1 shows a lens arrangement of a first numerical embodiment of a zoom lens system, according to the present invention, at the long focal length extremity when focused on an object at infinity.
Figure 4:
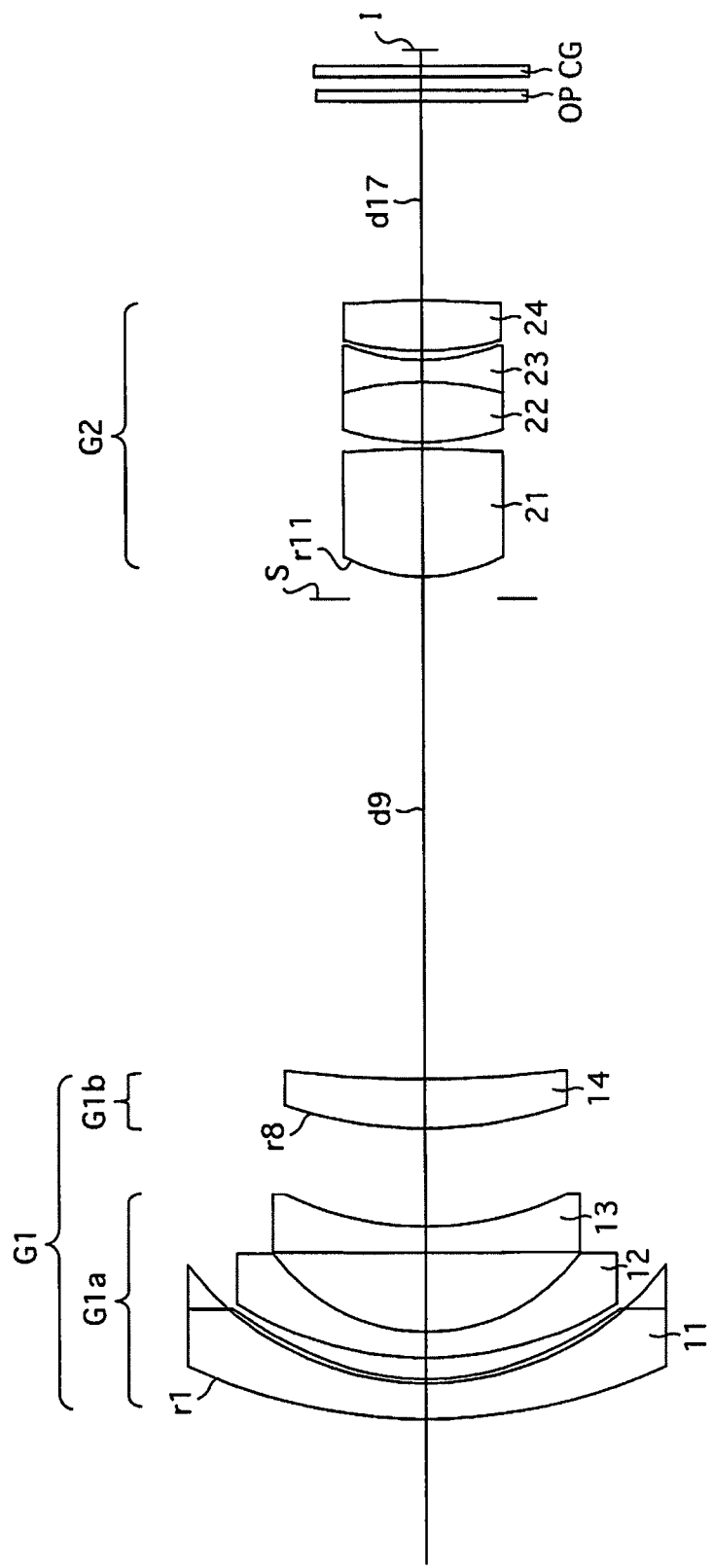
FIG. 4 shows a lens arrangement of the first numerical embodiment of the zoom lens system, according to the present invention, at the short focal length extremity when focused on an object at infinity.

FIGS. 1 through 6D and Tables 1 through 4 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. FIG. 4 shows a lens arrangement of the first numerical embodiment of the zoom lens system at the short focal length extremity when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. Table 1 shows the lens surface data, Table 2 shows various data of the zoom lens system, Table 3 shows the aspherical surface data, and Table 4 shows various data of the lens groups according to the first numerical embodiment of the present invention.

The zoom lens system of the present invention is configured of a negative first lens group G1 and a positive second lens group G2, in that order from the object side.

The first lens group G1 is configured of a negative first sub-lens group G1a and a positive second sub-lens group G1b, in that order from the object side.

The first sub-lens group G1a is configured of a negative meniscus lens element 11 having a convex surface on the object side, a negative meniscus lens element 12 having a convex surface on the object side, and a negative meniscus lens element 13 having a convex surface on the object side, in that order from the object side. The negative meniscus lens element 11 that is provided closest to the object side within the first sub-lens group G1a is a hybrid lens configured of an aspherical layer formed from a compound resin material bonded onto a glass lens element.

The second sub-lens group G1b is configured of a positive meniscus single lens element 14 having a convex surface on the object side. The positive meniscus single lens element 14 (second sub-lens group G1b) constitutes a focusing lens group which is moved in the optical axis direction during a focusing operation. In other words, upon carrying out a focusing operation so as to focus on an object at infinity through to an object at a finite distance, the positive meniscus single lens element 14 (second sub-lens group G1b) is moved in the optical axis direction toward the image side.

The second lens group G2 is configured of a biconvex positive lens element 21, a cemented lens having a biconvex positive lens element 22 and a biconcave negative lens element 23; and a biconvex positive lens element 24, in that order from the object side. Each of the biconvex positive lens elements 21 and 24 is provided with an aspherical surface on each side thereof. The diaphragm S which is provided in between the second sub-lens group G1b (first lens group G1) and the second lens group G2 moves integrally with the second lens group G2 in the optical axis direction. An optical filter OP and a cover glass CG are positioned behind the second lens group G2 (the biconvex positive lens element 24) (in between the second lens group G2 and the imaging plane I).

TABLE 1

SURFACE DATA

| Surf. No. | r | d | N(d) | ν d |
|---|---|---|---|---|
| 1 | 26.218 | 1.637 | 1.69680 | 55.5 |
| 2 | 13.873 | 0.177 | 1.52972 | 42.7 |
| 3* | 12.067 | 1.000 | | |
| 4 | 16.556 | 1.200 | 1.77250 | 49.6 |
| 5 | 8.739 | 3.611 | | |
| 6 | 520.355 | 1.200 | 1.77251 | 49.6 |
| 7 | 15.115 | 4.435 | | |
| 8 | 20.342 | 2.243 | 1.84666 | 23.8 |
| 9 | 56.198 | d9 | | |
| 10(Diaphragm) | ∞ | 1.000 | | |
| 11* | 7.708 | 5.800 | 1.49842 | 76.7 |
| 12* | −34.307 | 0.304 | | |
| 13 | 11.901 | 2.747 | 1.49700 | 81.6 |
| 14 | −14.016 | 1.000 | 1.83400 | 37.3 |
| 15 | 9.400 | 0.435 | | |
| 16* | 17.216 | 2.266 | 1.55332 | 71.7 |
| 17* | −24.807 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 2

ZOOM LENS SYSTEM DATA
Zoom Ratio: 2.89

| | Short Focal Length Extremity | Intermediate Focal Length | Long Focal Length Extremity |
|---|---|---|---|
| FNO. | 2.8 | 3.7 | 4.6 |
| f | 5.14 | 10.01 | 14.83 |
| W | 46.1 | 25.4 | 17.5 |
| Y | 4.65 | 4.65 | 4.65 |
| fB | 0.53 | 0.53 | 0.53 |
| L | 62.05 | 52.14 | 52.33 |
| d9 | 21.817 | 6.354 | 1.049 |
| d17 | 9.026 | 14.577 | 20.071 |

TABLE 3

Aspherical Surface Data (the aspherical surface coefficients not indicated are zero (0.00)):

| Surf. No. | K | A4 | A6 | A8 |
|---|---|---|---|---|
| 3 | 0.000 | −0.6937E−04 | −0.1141E−06 | −0.4468E−08 |
| 11 | 0.000 | −0.8088E−04 | −0.1122E−05 | |
| 12 | 0.000 | 0.3633E−03 | −0.7727E−05 | 0.2257E−06 |
| 16 | 0.000 | 0.6590E−03 | −0.1992E−04 | |
| 17 | 0.000 | 0.7315E−03 | 0.2868E−05 | |

TABLE 4

LENS GROUP DATA

| Lens Group | 1st Surf. | Focal Length |
|---|---|---|
| 1 | 1 | −11.97 |
| 2 | 11 | 13.65 |

Numerical Embodiment 2

Figure 7:
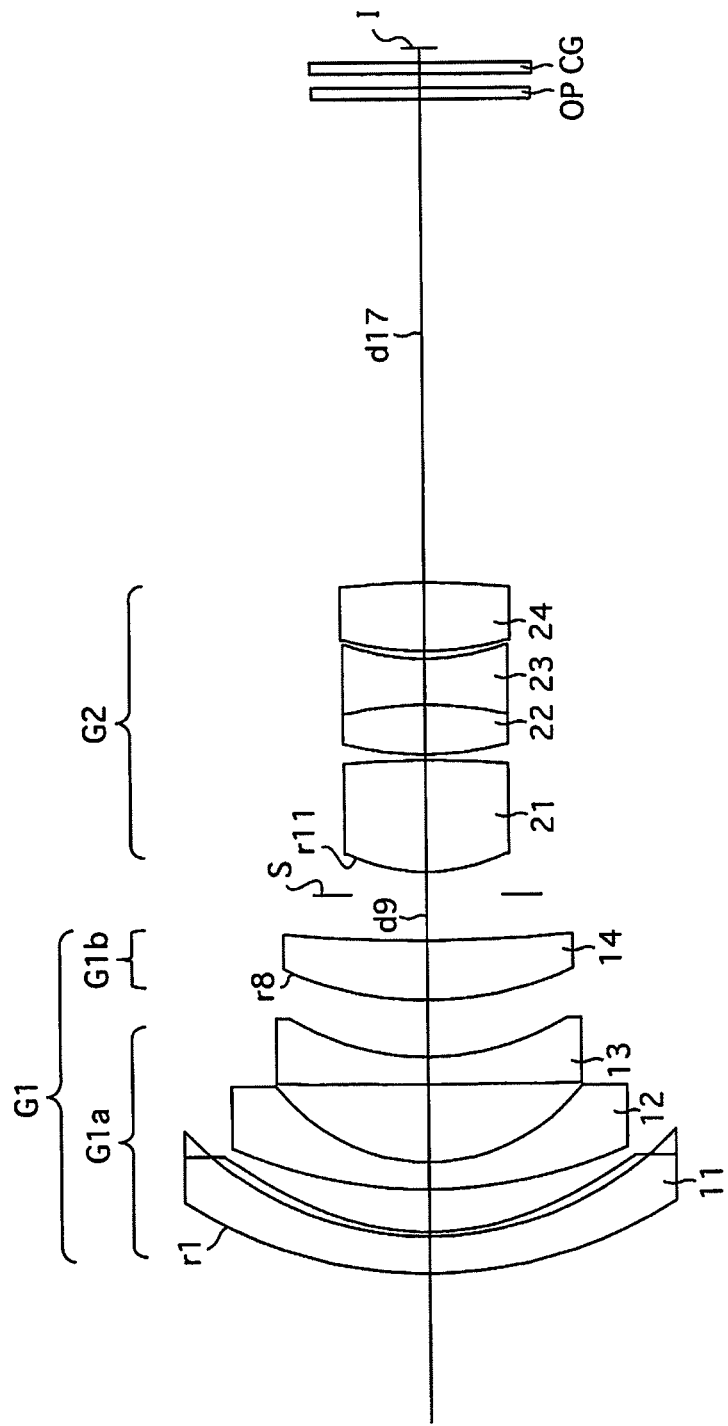
FIG. 7 shows a lens arrangement of a second numerical embodiment of a zoom lens system, according to the present invention, at the long focal length extremity when focused on an object at infinity.
Figure 8A:
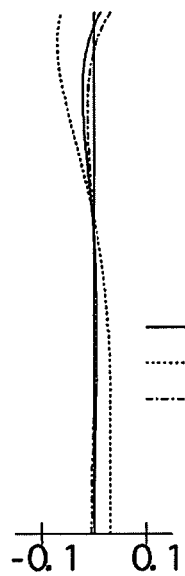
FIGS. 8A, 8B, 8C and 8D show various aberrations that occurred in the lens arrangement shown in FIG. 7.
Figure 8B:
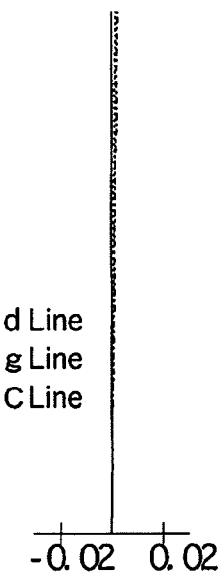
Figure 8C:
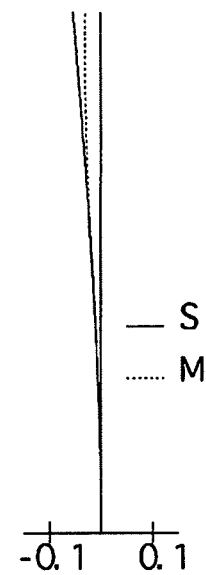
Figure 8D:
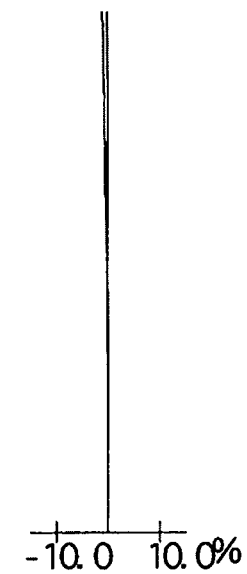
Figure 9A:
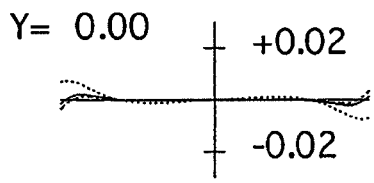
FIGS. 9A, 9B, 9C and 9D show lateral aberrations that occurred in the lens arrangement shown in FIG. 7.
Figure 9B:
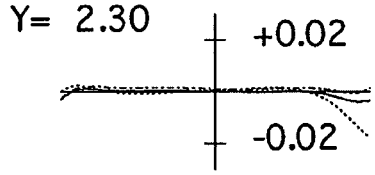
Figure 9C:
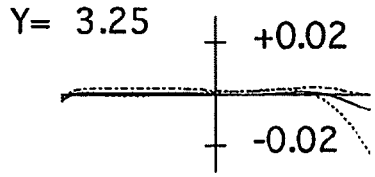
Figure 9D:
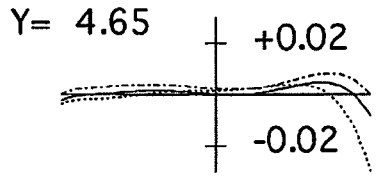
Figure 10:
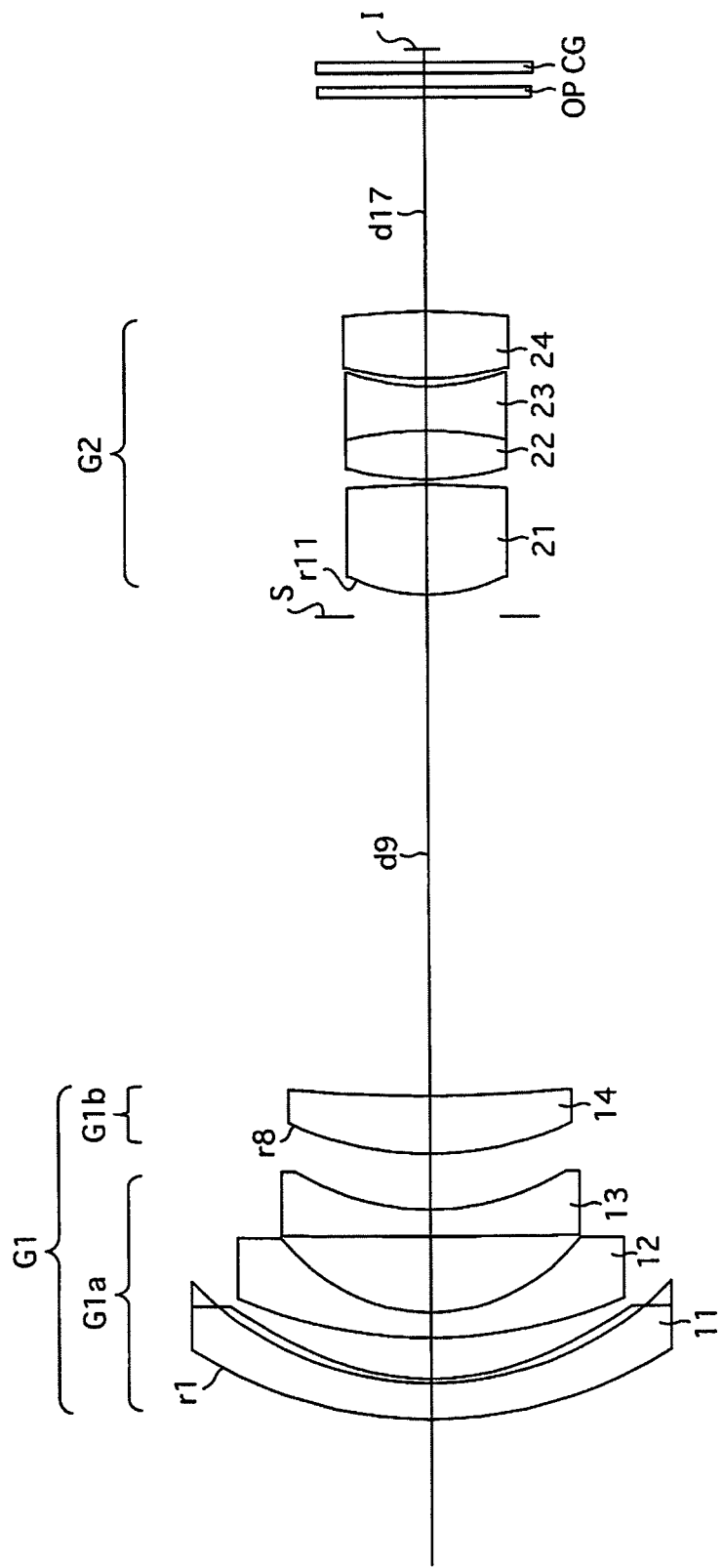
FIG. 10 shows a lens arrangement of the second numerical embodiment of the zoom lens system, according to the present invention, at the short focal length extremity when focused on an object at infinity.

FIGS. 7 through 12D and Tables 5 through 8 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. FIG. 10 shows a lens arrangement of the second numerical embodiment of the zoom lens system at the short focal length extremity when focused on an object at infinity. FIGS. 11A, 11B, 11C and 11D show various aberrations that occurred in the lens arrangement shown in FIG. 10. FIGS. 12A, 12B, 12C and 12D show lateral aberrations that occurred in the lens arrangement shown in FIG. 10. Table 5 shows the lens surface data, Table 6 shows various data of the zoom lens system, Table 7 shows the aspherical surface data, and Table 8 shows various data of the lens groups according to the second numerical embodiment of the present invention.

The lens arrangement of the second numerical embodiment is the same as that of the first numerical embodiment.

TABLE 5

SURFACE DATA

| Surf. No. | r | d | N(d) | ν d |
|---|---|---|---|---|
| 1 | 20.575 | 1.637 | 1.77250 | 49.6 |
| 2 | 15.231 | 0.200 | 1.52972 | 42.7 |
| 3* | 12.272 | 1.887 | | |
| 4 | 21.964 | 1.200 | 1.80420 | 46.5 |
| 5 | 8.675 | 3.450 | | |
| 6 | 694.331 | 1.200 | 1.77250 | 49.6 |
| 7 | 12.094 | 2.516 | | |
| 8 | 15.943 | 2.621 | 1.84666 | 23.8 |
| 9 | 69.080 | d9 | | |
| 10(Diaphragm) | ∞ | 1.000 | | |
| 11* | 7.995 | 4.961 | 1.49700 | 81.6 |
| 12* | −33.582 | 0.257 | | |
| 13 | 14.582 | 2.184 | 1.49700 | 81.6 |
| 14 | −16.807 | 2.020 | 1.83400 | 37.3 |
| 15 | 10.520 | 0.353 | | |
| 16* | 15.493 | 3.012 | 1.55332 | 71.7 |
| 17* | −22.403 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 6

ZOOM LENS SYSTEM DATA
Zoom Ratio: 2.90

| | Short Focal Length Extremity | Intermediate Focal Length | Long Focal Length Extremity |
|---|---|---|---|
| FN0. | 2.8 | 3.7 | 4.5 |
| f | 5.14 | 10.00 | 14.91 |
| W | 46.2 | 25.5 | 17.5 |
| Y | 4.65 | 4.65 | 4.65 |
| fB | 0.53 | 0.53 | 0.53 |
| L | 61.99 | 53.19 | 53.97 |
| d9 | 21.697 | 7.096 | 2.015 |
| d17 | 9.646 | 15.449 | 21.306 |

TABLE 7

Aspherical Surface Data (the aspherical surface coefficients not indicated are zero (0.00)):

| Surf. No. | K | A4 | A6 | A8 |
|---|---|---|---|---|
| 3 | 0.000 | −0.5962E−04 | −0.2397E−06 | −0.3978E−08 |
| 11 | 0.000 | −0.5955E−04 | −0.8318E−06 | |
| 12 | 0.000 | 0.3204E−03 | −0.5790E−05 | 0.1556E−06 |
| 16 | 0.000 | 0.4113E−03 | −0.1270E−04 | |
| 17 | 0.000 | 0.5306E−03 | 0.4139E−05 | |

TABLE 8

LENS GROUP DATA

| Lens Group | 1st Surf. | Focal Length |
|---|---|---|
| 1 | 1 | −11.37 |
| 2 | 11 | 13.58 |

Numerical Embodiment 3

Figure 16:
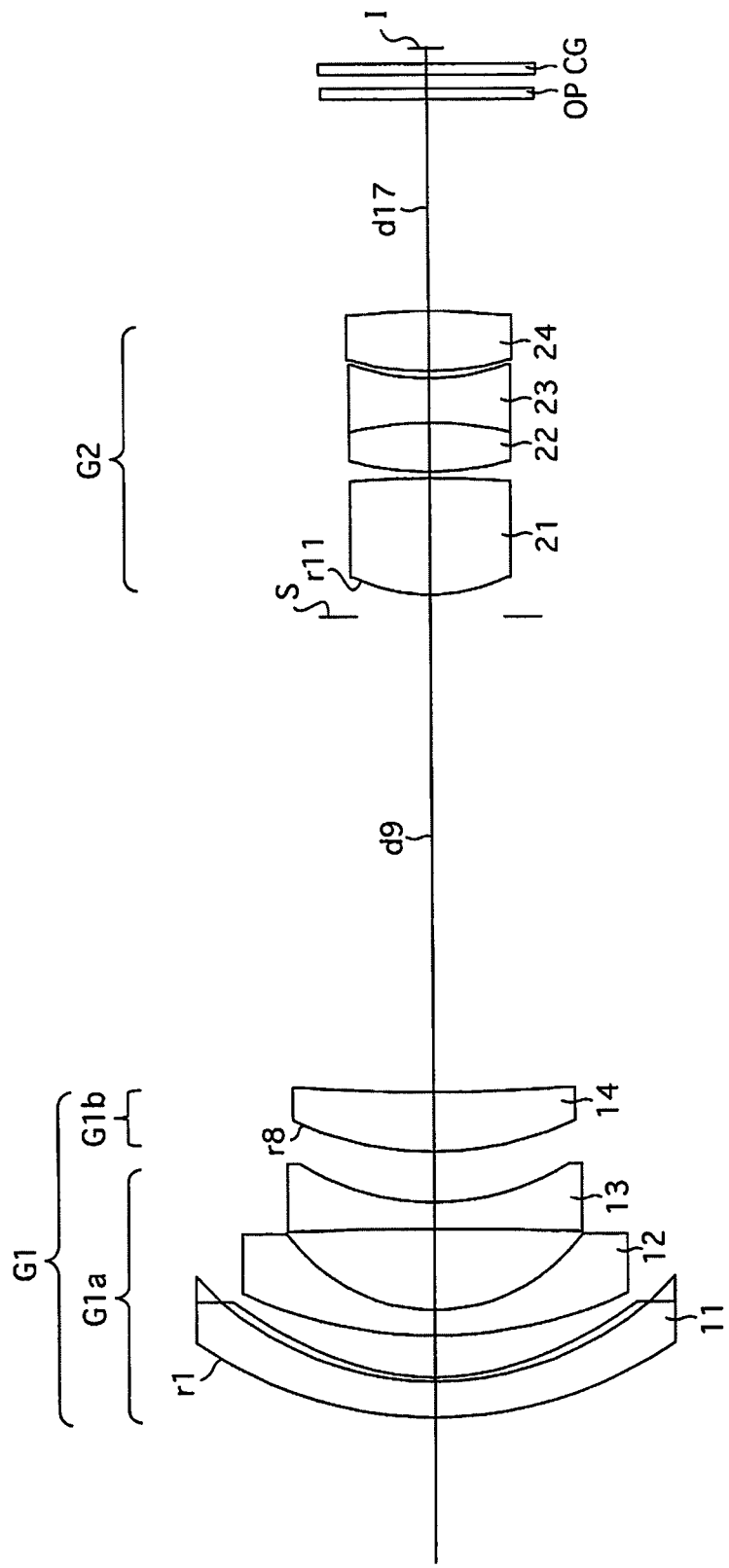
FIG. 16 shows a lens arrangement of the third numerical embodiment of the zoom lens system, according to the present invention, at the short focal length extremity when focused on an object at infinity.
Figures 17A, 17B, 17C, 17D:
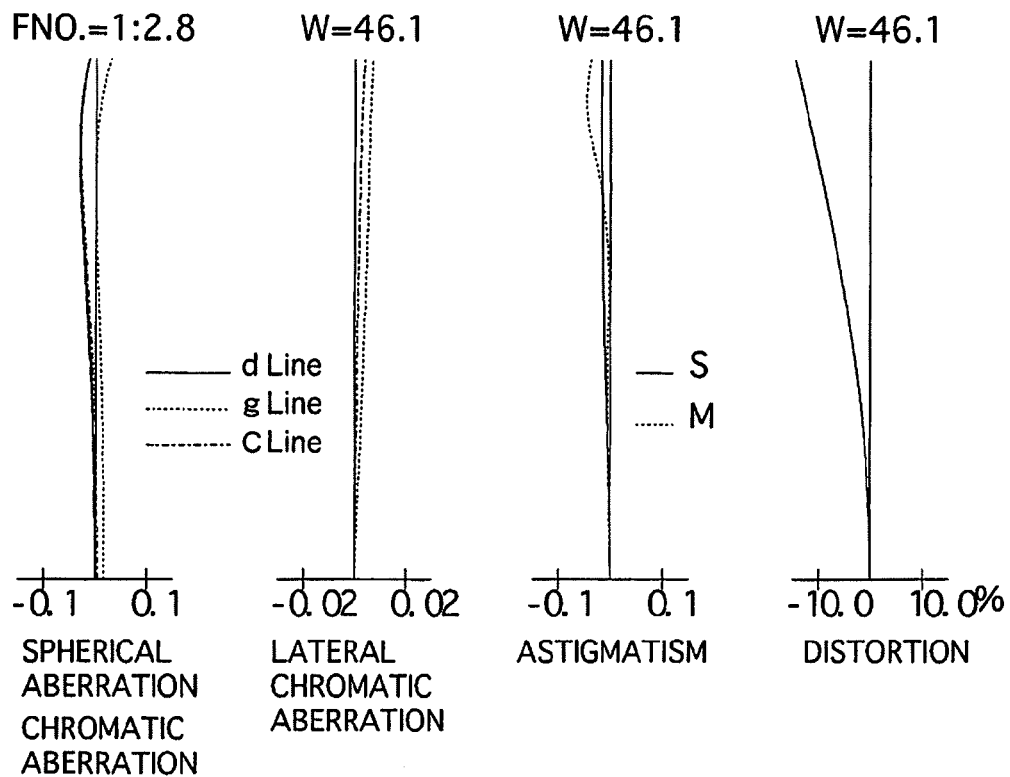
FIGS. 17A, 17B, 17C and 17D show various aberrations that occurred in the lens arrangement shown in FIG. 16.
Figure 18A:
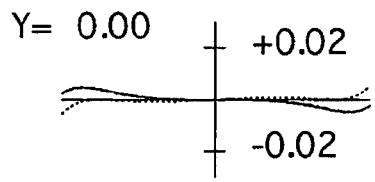
FIGS. 18A, 18B, 18C and 18D show lateral aberrations that occurred in the lens arrangement shown in FIG. 16.
Figure 18B:
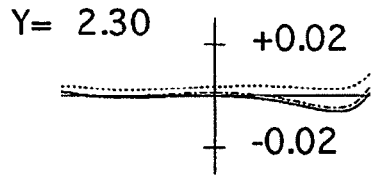
Figure 18C:
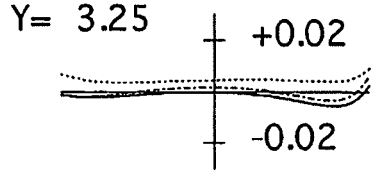
Figure 18D:
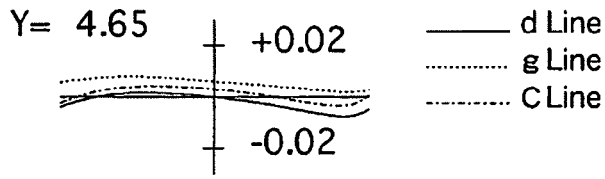

FIGS. 13 through 18D and Tables 9 through 12 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIGS. 15A, 15B, 15C and 15D show lateral aberrations that occurred in the lens arrangement shown in FIG. 13. FIG. 16 shows a lens arrangement of the third numerical embodiment of the zoom lens system at the short focal length extremity when focused on an object at infinity. FIGS. 17A, 17B, 17C and 17D show various aberrations that occurred in the lens arrangement shown in FIG. 16. FIGS. 18A, 18B, 18C and 18D show lateral aberrations that occurred in the lens arrangement shown in FIG. 16. Table 9 shows the lens surface data, Table 10 shows various data of the zoom lens system, Table 11 shows the aspherical surface data, and Table 12 shows various data of the lens groups according to the third numerical embodiment of the present invention.

The lens arrangement of the third numerical embodiment is the same as that of the first numerical embodiment except that the negative lens element 13 of the first sub-lens group G1*a* is a biconcave negative lens element.

TABLE 9

SURFACE DATA

| Surf. No. | r | d | N(d) | νd |
|---|---|---|---|---|
| 1 | 19.363 | 1.637 | 1.77250 | 47.9 |
| 2 | 14.885 | 0.200 | 1.52972 | 42.7 |
| 3* | 12.109 | 1.939 | | |
| 4 | 20.859 | 1.200 | 1.80400 | 41.0 |
| 5 | 8.493 | 3.654 | | |
| 6 | −200.369 | 1.200 | 1.77250 | 49.6 |
| 7 | 11.922 | 2.311 | | |
| 8 | 15.842 | 2.696 | 1.84666 | 23.8 |
| 9 | 91.781 | d9 | | |
| 10(Diaphragm) | ∞ | 1.000 | | |
| 11* | 8.005 | 5.288 | 1.49700 | 81.6 |
| 12* | −33.215 | 0.296 | | |
| 13 | 14.374 | 2.222 | 1.49700 | 81.6 |
| 14 | −15.861 | 2.020 | 1.83400 | 37.3 |
| 15 | 10.479 | 0.339 | | |
| 16* | 15.281 | 2.726 | 1.55332 | 71.7 |
| 17* | −21.897 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 10

ZOOM LENS SYSTEM DATA
Zoom Ratio: 2.90

| | Short Focal Length Extremity | Intermediate Focal Length | Long Focal Length Extremity |
|---|---|---|---|
| FNO. | 2.8 | 3.7 | 4.5 |
| f | 5.14 | 10.00 | 14.91 |
| W | 46.1 | 25.5 | 17.4 |
| Y | 4.65 | 4.65 | 4.65 |
| fB | 0.53 | 0.53 | 0.53 |
| L | 62.00 | 53.32 | 54.15 |
| d9 | 21.564 | 7.074 | 2.039 |
| d17 | 9.560 | 15.372 | 21.229 |

TABLE 11

Aspherical Surface Data (the aspherical surface coefficients not indicated are zero (0.00)):

| Surf. No. | K | A4 | A6 | A8 |
|---|---|---|---|---|
| 3 | 0.000 | −0.6380E−04 | −0.1851E−06 | −0.4616E−08 |
| 11 | 0.000 | −0.6157E−04 | −0.7887E−06 | |
| 12 | 0.000 | 0.3298E−03 | −0.5525E−05 | 0.1536E−06 |
| 16 | 0.000 | 0.4683E−03 | −0.1224E−04 | |
| 17 | 0.000 | 0.5678E−03 | 0.4558E−05 | |

TABLE 12

LENS GROUP DATA

| Lens Group | 1st Surf. | Focal Length |
|---|---|---|
| 1 | 1 | −11.32 |
| 2 | 11 | 13.53 |

Numerical Embodiment 4

Figure 19:
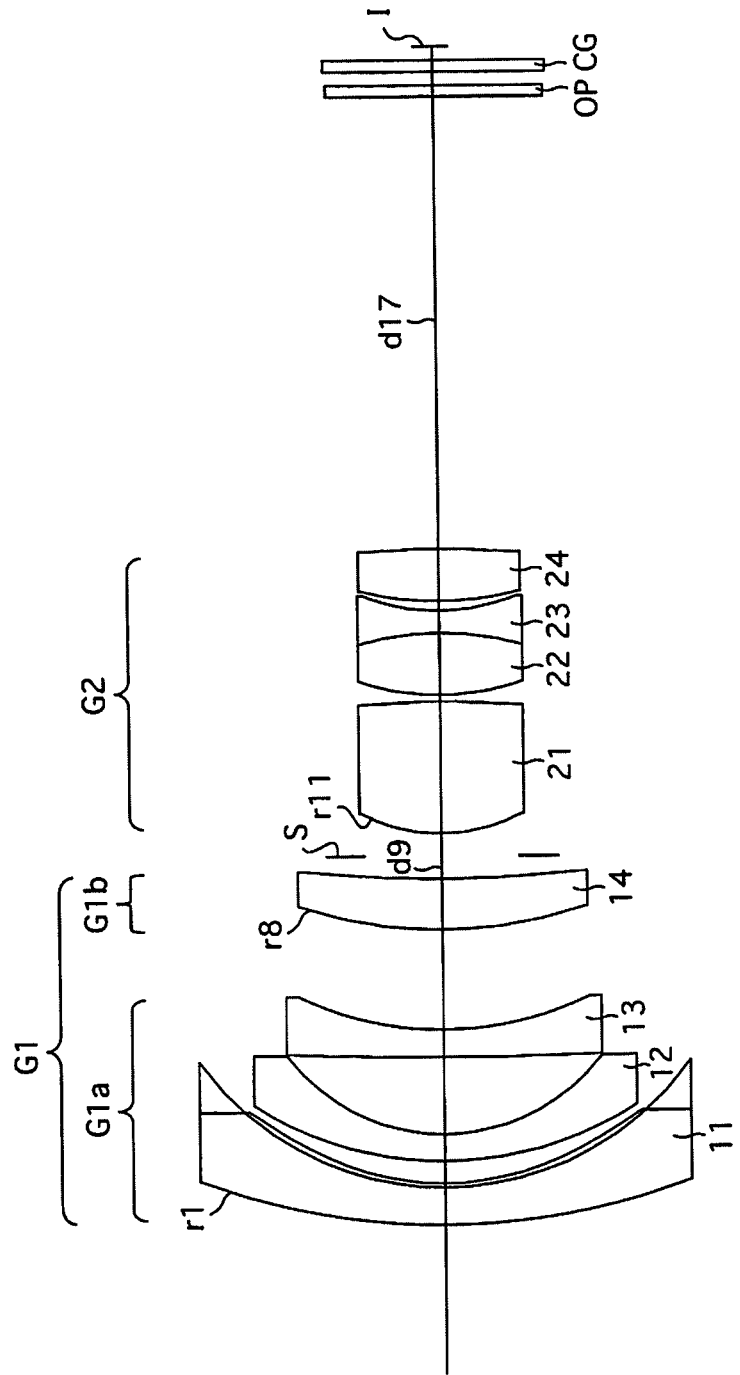
FIG. 19 shows a lens arrangement of a fourth numerical embodiment of a zoom lens system, according to the present invention, at the long focal length extremity when focused on an object at infinity.
Figures 20A, 20B, 20C, 20D:
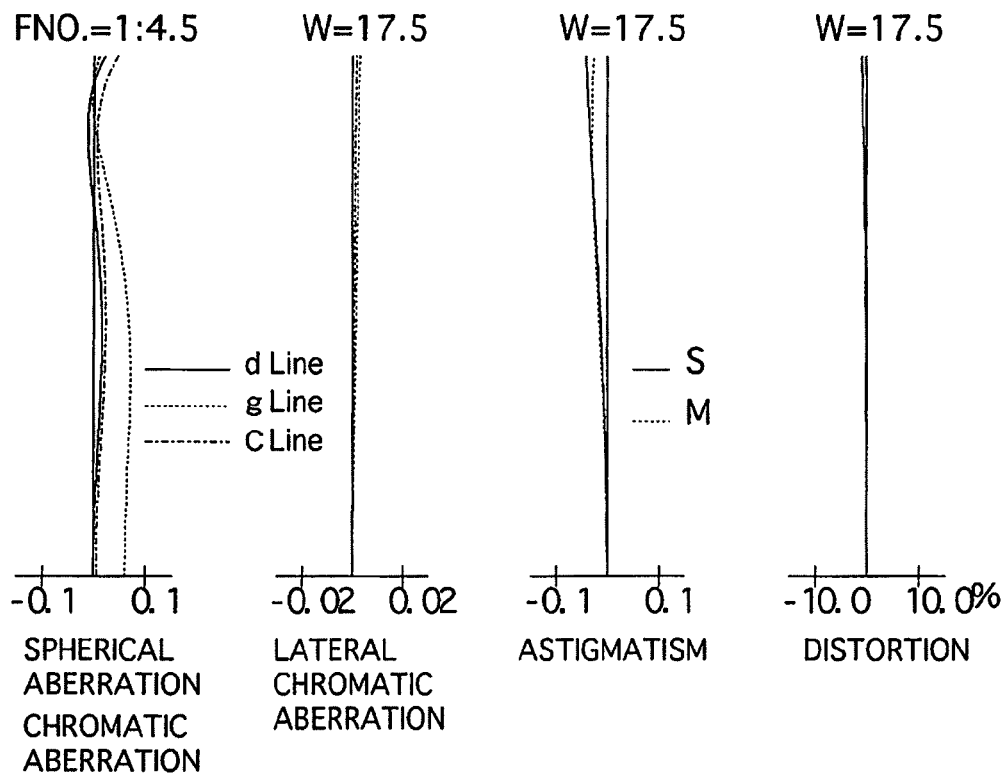
FIGS. 20A, 20B, 20C and 20D show various aberrations that occurred in the lens arrangement shown in FIG. 19.
Figure 21A:
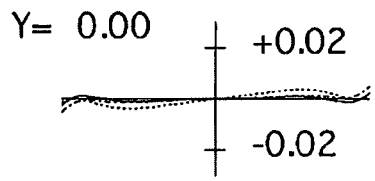
FIGS. 21A, 21B, 21C and 21D show lateral aberrations that occurred in the lens arrangement shown in FIG. 19.
Figure 21B:
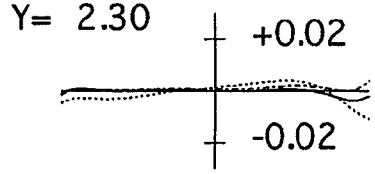
Figure 21C:
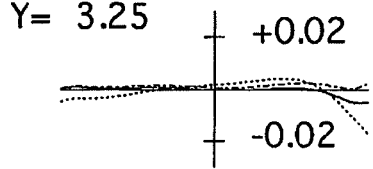
Figure 21D:
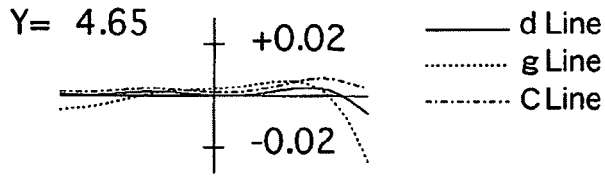
Figure 22:
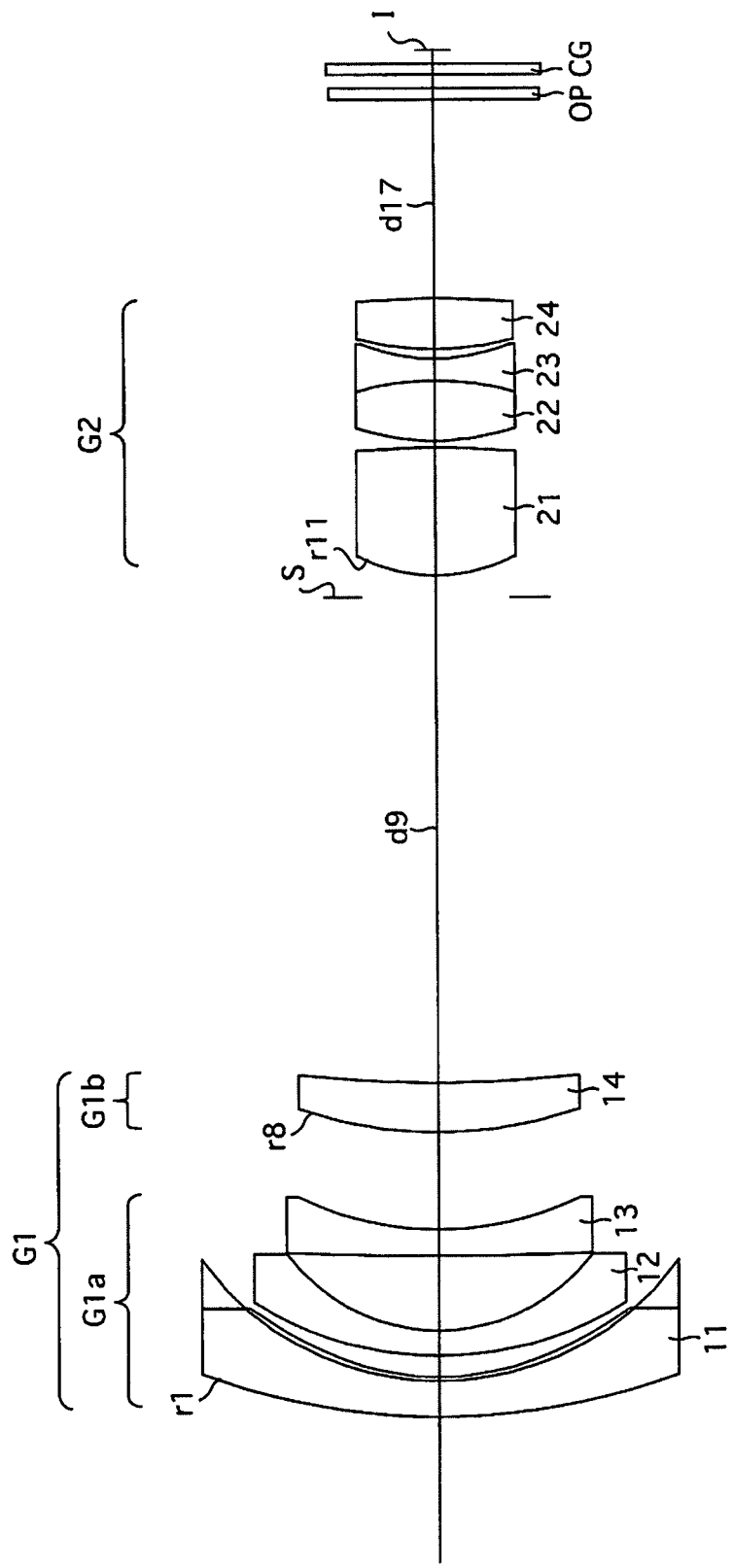
FIG. 22 shows a lens arrangement of the fourth numerical embodiment of the zoom lens system, according to the present invention, at the short focal length extremity when focused on an object at infinity.
Figures 23A, 23B, 23C, 23D:
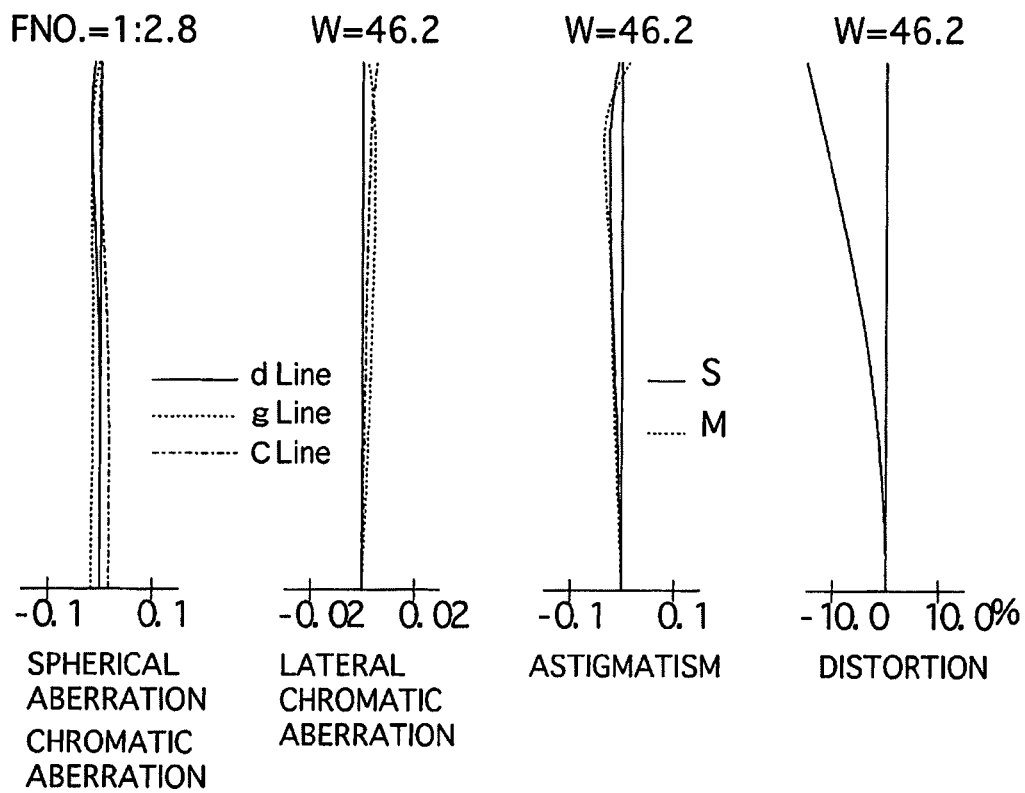
FIGS. 23A, 23B, 23C and 23D show various aberrations that occurred in the lens arrangement shown in FIG. 22.
Figure 24A:
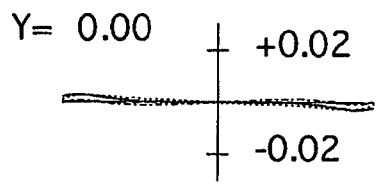
FIGS. 24A, 24B, 24C and 24D show lateral aberrations that occurred in the lens arrangement shown in FIG. 22.
Figure 24B:
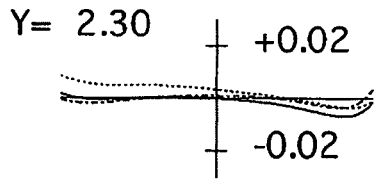
Figure 24C:
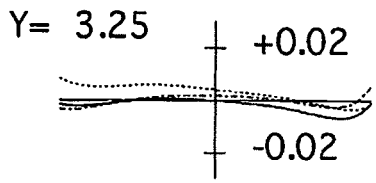
Figure 24D:
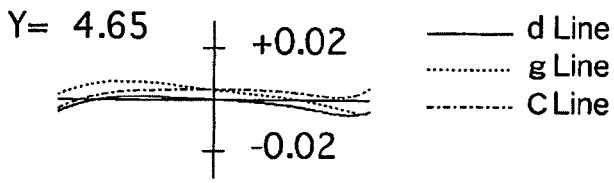
Figures 26A, 26B, 26C, 26D:
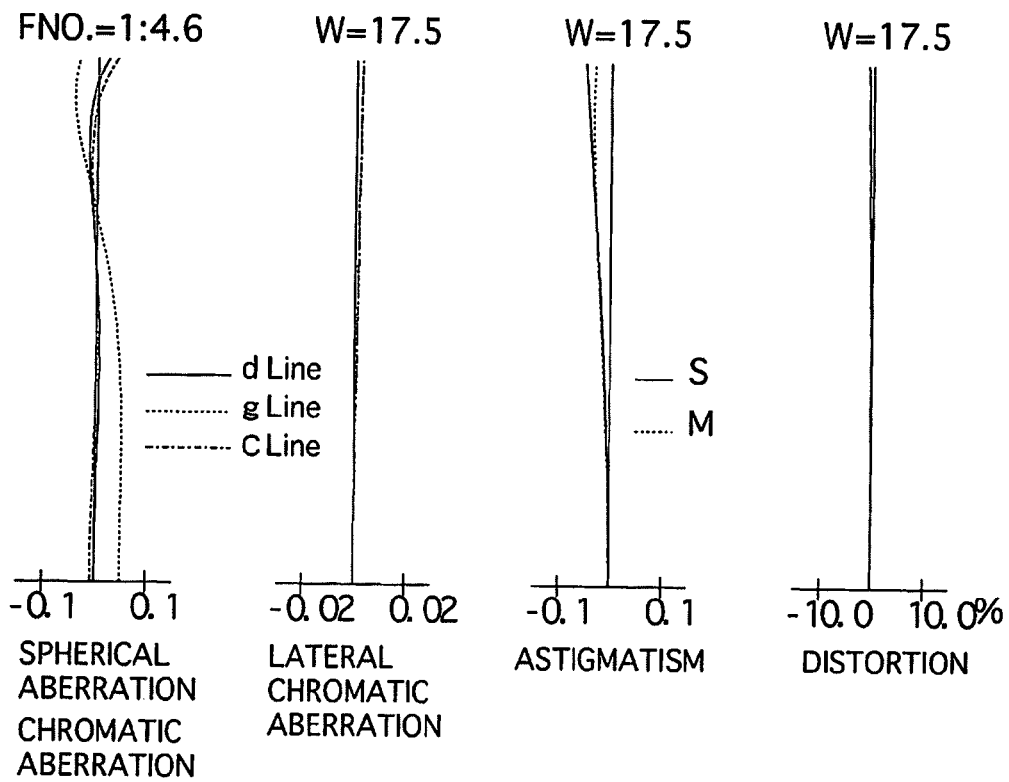
FIGS. 26A, 26B, 26C and 26D show various aberrations that occurred in the lens arrangement shown in FIG. 25.
Figure 27A:
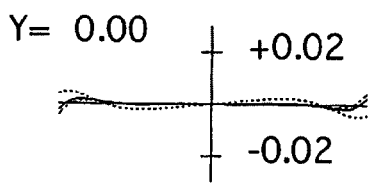
FIGS. 27A, 27B, 27C and 27D show lateral aberrations that occurred in the lens arrangement shown in FIG. 25.
Figure 27B:
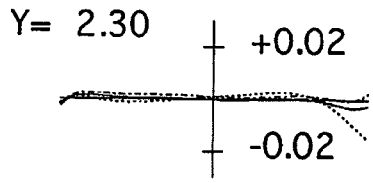
Figure 27C:
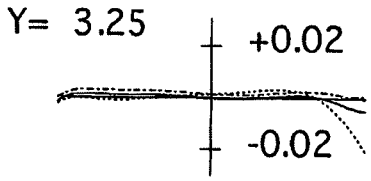
Figure 27D:
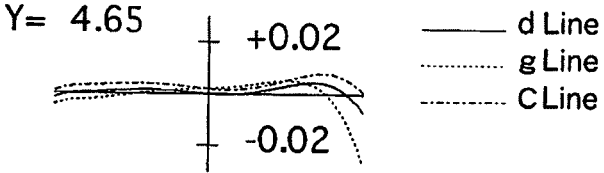

FIGS. 19 through 24D and Tables 13 through 16 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIGS. 21A, 21B, 21C and 21D show lateral aberrations that occurred in the lens arrangement shown in FIG. 19. FIG. 22 shows a lens arrangement of the fourth numerical embodiment of the zoom lens system at the short focal length extremity when focused on an object at infinity. FIGS. 23A, 23B, 23C and 23D show various aberrations that occurred in the lens arrangement shown in FIG. 22. FIGS. 24A, 24B, 24C and 24D show lateral aberrations that occurred in the lens arrangement shown in FIG. 22. Table 13 shows the lens surface data, Table 14 shows various data of the zoom lens system, Table 15 shows the aspherical surface data, and Table 16 shows various data of the lens groups according to the fourth numerical embodiment of the present invention.

The lens arrangement of the fourth numerical embodiment is the same as that of the first numerical embodiment.

TABLE 13

SURFACE DATA

| Surf. No. | r | d | N(d) | νd |
|---|---|---|---|---|
| 1 | 31.880 | 1.637 | 1.69680 | 55.5 |
| 2 | 13.612 | 0.167 | 1.52972 | 42.7 |
| 3* | 11.743 | 1.000 | | |
| 4 | 15.951 | 1.200 | 1.77250 | 49.6 |
| 5 | 8.904 | 3.415 | | |
| 6 | 173.586 | 1.200 | 1.77251 | 49.6 |
| 7 | 15.444 | 4.416 | | |
| 8 | 20.405 | 2.245 | 1.84666 | 23.8 |
| 9 | 56.532 | d9 | | |
| 10(Diaphragm) | ∞ | 1.000 | | |
| 11* | 7.694 | 5.814 | 1.49833 | 76.1 |
| 12* | −33.767 | 0.303 | | |
| 13 | 11.864 | 2.725 | 1.49700 | 81.6 |
| 14 | −13.660 | 1.000 | 1.83400 | 37.3 |
| 15 | 9.319 | 0.438 | | |
| 16* | 17.172 | 2.288 | 1.55332 | 71.7 |
| 17* | −24.667 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 14

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.7 | 4.5 |
| f | 5.14 | 10.01 | 14.81 |
| W | 46.2 | 25.4 | 17.5 |
| Y | 4.65 | 4.65 | 4.65 |
| fB | 0.53 | 0.53 | 0.53 |
| L | 62.07 | 51.89 | 51.96 |
| d9 | 22.064 | 6.370 | 1.000 |
| d17 | 9.004 | 14.520 | 19.959 |

TABLE 15

Aspherical Surface Data (the aspherical surface coefficients not indicated are zero (0.00)):

| Surf. No. | K | A4 | A6 | A8 |
|---|---|---|---|---|
| 3 | 0.000 | −0.7761E−04 | −0.1597E−06 | −0.5268E−08 |
| 11 | 0.000 | −0.8177E−04 | −0.1170E−05 | |
| 12 | 0.000 | 0.3629E−03 | −0.7950E−05 | 0.2269E−06 |
| 16 | 0.000 | 0.6701E−03 | −0.2037E−04 | |
| 17 | 0.000 | 0.7333E−03 | 0.2848E−05 | |

TABLE 16

LENS GROUP DATA

| Lens Group | 1st Surf. | Focal Length |
|---|---|---|
| 1 | 1 | −12.10 |
| 2 | 11 | 13.70 |

Numerical Embodiment 5

Figure 28:
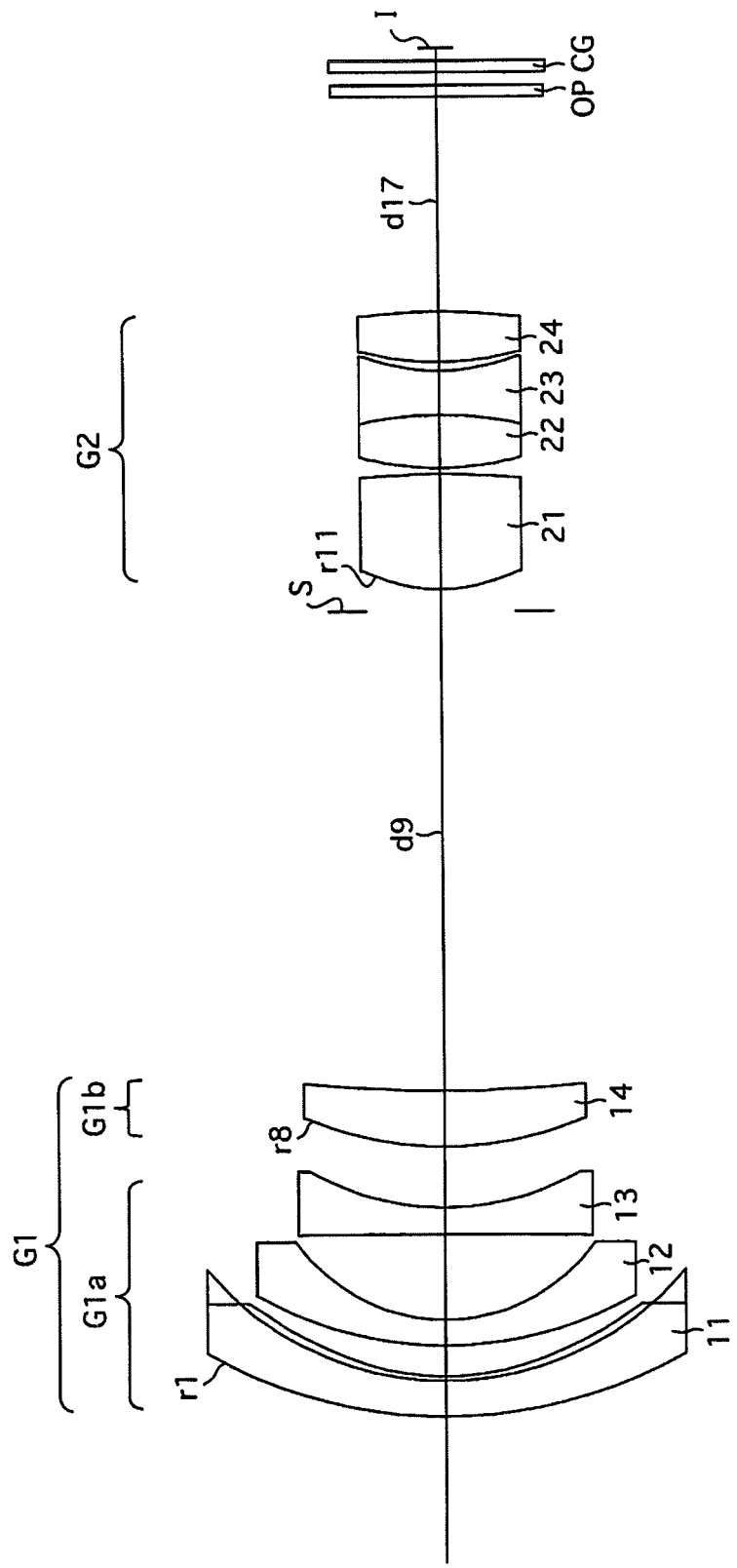
FIG. 28 shows a lens arrangement of the fifth numerical embodiment of the zoom lens system, according to the present invention, at the short focal length extremity when focused on an object at infinity.

FIGS. 25 through 30D and Tables 17 through 20 show a fifth numerical embodiment of a zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIGS. 27A, 27B, 27C and 27D show lateral aberrations that occurred in the lens arrangement shown in FIG. 25. FIG. 28 shows a lens arrangement of the fifth numerical embodiment of the zoom lens system at the short focal length extremity when focused on an object at infinity. FIGS. 29A, 29B, 29C and 29D show various aberrations that occurred in the lens arrangement shown in FIG. 28. FIGS. 30A, 30B, 30C and 30D show lateral aberrations that occurred in the lens arrangement shown in FIG. 28. Table 17 shows the lens surface data, Table 18 shows various data of the zoom lens system, Table 19 shows the aspherical surface data, and Table 20 shows various data of the lens groups according to the fifth numerical embodiment of the present invention.

The lens arrangement of the fifth numerical embodiment is the same as that of the third numerical embodiment.

TABLE 17

SURFACE DATA

| Surf. No. | r | d | N(d) | ν d |
|---|---|---|---|---|
| 1 | 22.339 | 1.640 | 1.77250 | 49.6 |
| 2 | 14.420 | 0.200 | 1.52972 | 42.7 |
| 3* | 11.978 | 1.440 | | |
| 4 | 17.550 | 1.200 | 1.80420 | 46.5 |
| 5 | 8.600 | 3.860 | | |
| 6 | −447.347 | 1.200 | 1.77250 | 49.6 |
| 7 | 12.800 | 2.763 | | |
| 8 | 16.900 | 2.529 | 1.84666 | 23.8 |
| 9 | 68.597 | d9 | | |
| 10(Diaphragm) | ∞ | 1.000 | | |
| 11* | 7.991 | 5.220 | 1.49700 | 81.6 |
| 12* | −33.330 | 0.280 | | |
| 13 | 14.372 | 2.420 | 1.49700 | 81.6 |
| 14 | −16.821 | 2.020 | 1.83400 | 37.3 |
| 15 | 9.930 | 0.390 | | |
| 16* | 15.811 | 2.290 | 1.55332 | 71.7 |
| 17* | −20.704 | d17 | | |
| 18 | ∞ | 0.500 | 1.51633 | 64.1 |

TABLE 17-continued

SURFACE DATA

| Surf. No. | r | d | N(d) | ν d |
|---|---|---|---|---|
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 18

ZOOM LENS SYSTEM DATA
Zoom Ratio: 2.89

| | Short Focal Length Extremity | Intermediate Focal Length | Long Focal Length Extremity |
|---|---|---|---|
| FNO. | 2.8 | 3.7 | 4.6 |
| f | 5.14 | 10.00 | 14.86 |
| W | 46.2 | 25.5 | 17.5 |
| Y | 4.65 | 4.65 | 4.65 |
| fB | 0.53 | 0.53 | 0.53 |
| L | 62.02 | 53.16 | 53.91 |
| d9 | 21.728 | 7.057 | 1.988 |
| d17 | 9.687 | 15.505 | 21.317 |

TABLE 19

Aspherical Surface Data (the aspherical surface coefficients not indicated are zero (0.00)):

| Surf. No. | K | A4 | A6 | A8 |
|---|---|---|---|---|
| 3 | 0.000 | −0.6621E−04 | −0.1494E−06 | −0.4856E−08 |
| 11 | 0.000 | −0.6786E−04 | −0.9051E−06 | |
| 12 | 0.000 | 0.3234E−03 | −0.5863E−05 | 0.1604E−06 |
| 16 | 0.000 | 0.4793E−03 | −0.1440E−04 | |
| 17 | 0.000 | 0.5626E−03 | 0.2871E−05 | |

TABLE 20

LENS GROUP DATA

| Lens Group | 1st Surf. | Focal Length |
|---|---|---|
| 1 | 1 | −11.39 |
| 2 | 11 | 13.62 |

Numerical Embodiment 6

Figure 31:
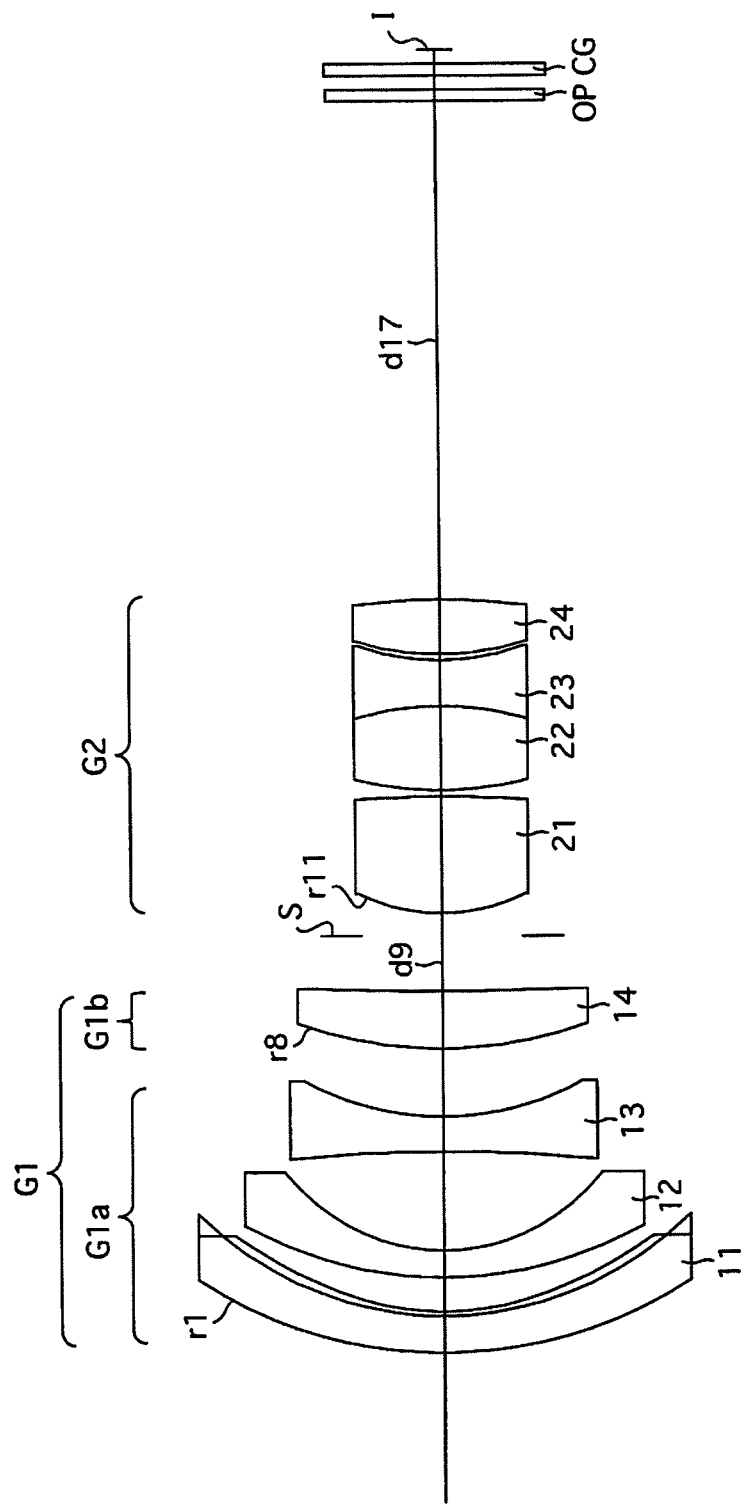
FIG. 31 shows a lens arrangement of a sixth numerical embodiment of a zoom lens system, according to the present invention, at the long focal length extremity when focused on an object at infinity.
Figure 34:
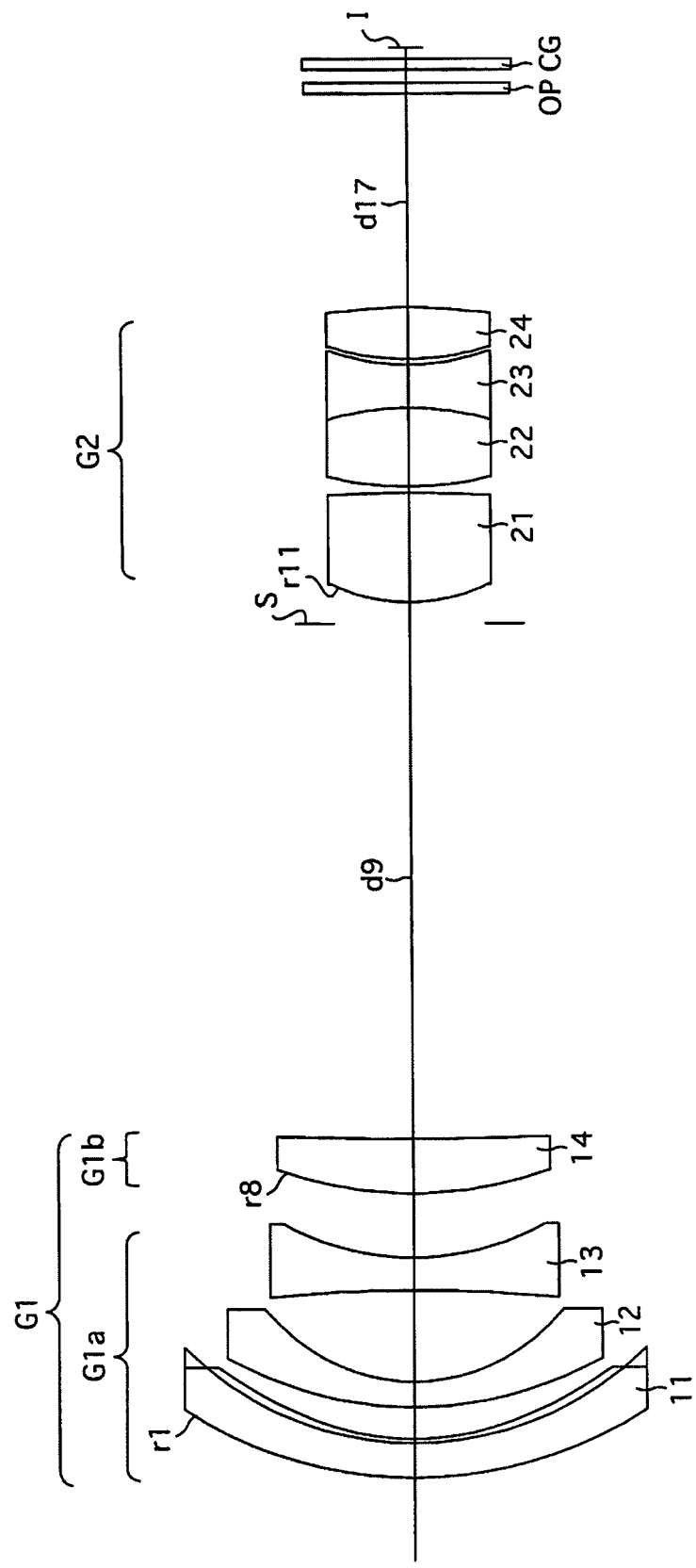
FIG. 34 shows a lens arrangement of the sixth numerical embodiment of the zoom lens system, according to the present invention, at the short focal length extremity when focused on an object at infinity.
Figures 35A, 35B, 35C, 35D:
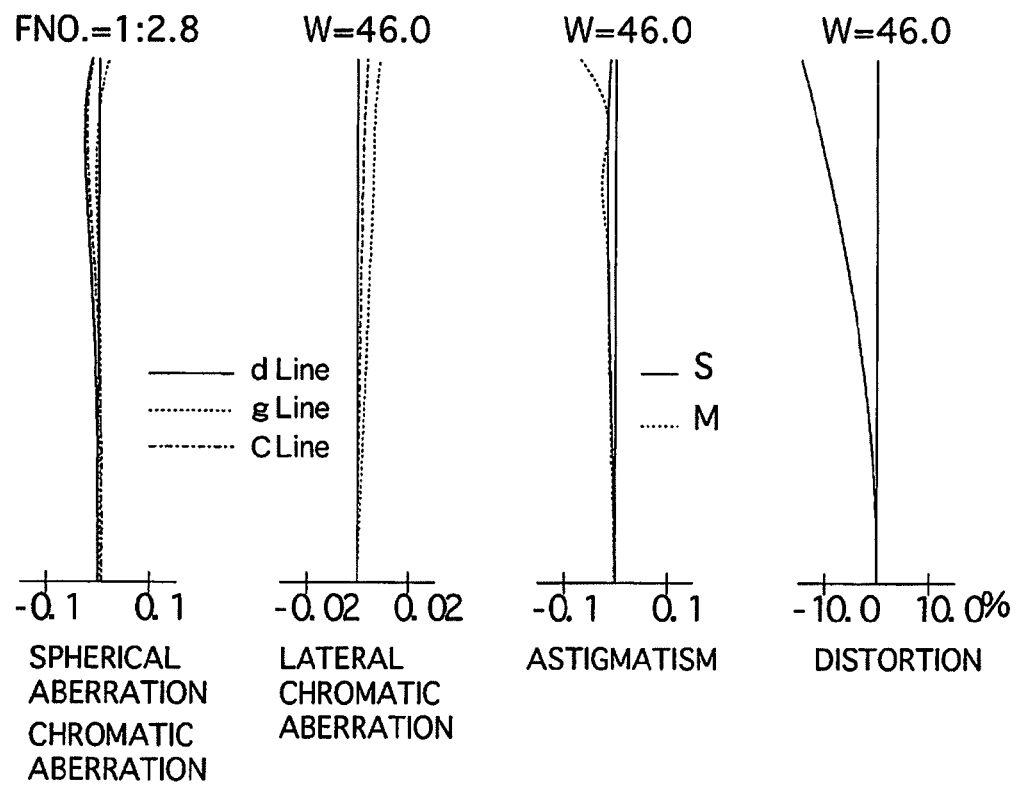
FIGS. 35A, 35B, 35C and 35D show various aberrations that occurred in the lens arrangement shown in FIG. 34.
Figure 36A:
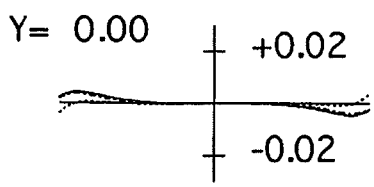
FIGS. 36A, 36B, 36C and 36D show lateral aberrations that occurred in the lens arrangement shown in FIG. 34.
Figure 36B:
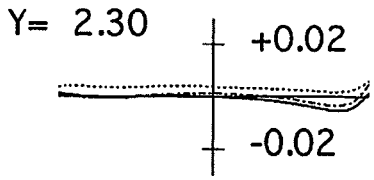
Figure 36C:
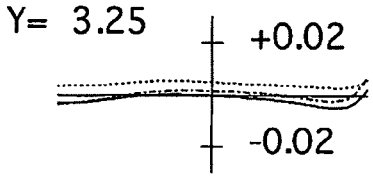
Figure 36D:
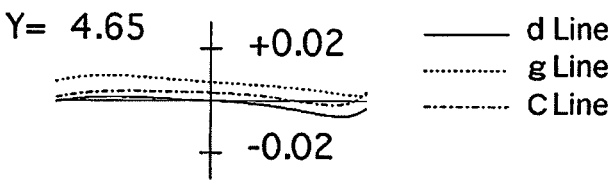

FIGS. 31 through 36D and Tables 21 through 24 show a sixth numerical embodiment of a zoom lens system according to the present invention. FIG. 31 shows a lens arrangement of the sixth numerical embodiment of the zoom lens system at the long focal length extremity when focused on an object at infinity. FIGS. 32A, 32B, 32C and 32D show various aberrations that occurred in the lens arrangement shown in FIG. 31. FIGS. 33A, 33B, 33C and 33D show lateral aberrations that occurred in the lens arrangement shown in FIG. 31. FIG. 34 shows a lens arrangement of the sixth numerical embodiment of the zoom lens system at the short focal length extremity when focused on an object at infinity. FIGS. 35A, 35B, 35C and 35D show various aberrations that occurred in the lens arrangement shown in FIG. 31. FIGS. 36A, 36B, 36C and 36D show lateral aberrations that occurred in the lens arrangement shown in FIG. 34. Table 21 shows the lens surface data, Table 22 shows various data of the zoom lens system, Table 23 shows the aspherical surface data, and Table 24 shows various data of the lens groups according to the sixth numerical embodiment of the present invention.

The lens arrangement of the sixth numerical embodiment is the same as that of the third numerical embodiment.

TABLE 21

SURFACE DATA

| Surf. No. | r | d | N(d) | ν d |
|---|---|---|---|---|
| 1 | 20.310 | 1.637 | 1.80400 | 39.7 |
| 2 | 15.604 | 0.200 | 1.52972 | 42.7 |
| 3* | 12.698 | 1.505 | | |
| 4 | 18.240 | 1.200 | 1.83481 | 41.5 |
| 5 | 8.984 | 4.375 | | |
| 6 | −70.473 | 1.518 | 1.77250 | 49.6 |
| 7 | 13.085 | 3.000 | | |
| 8 | 19.220 | 2.562 | 1.84666 | 23.8 |
| 9 | 163.157 | d9 | | |
| 10(Diaphragm) | ∞ | 1.000 | | |
| 11* | 8.612 | 5.110 | 1.49700 | 81.6 |
| 12* | −47.815 | 0.297 | | |
| 13 | 16.646 | 3.694 | 1.49700 | 81.6 |
| 14 | −14.006 | 2.020 | 1.83400 | 37.3 |
| 15 | 11.153 | 0.278 | | |
| 16* | 14.185 | 2.410 | 1.55332 | 71.7 |
| 17* | −19.638 | d17 | | |
| 18 | ∞ | 0.500 | 1.51633 | 64.1 |
| 19 | ∞ | 0.620 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 22

ZOOM LENS SYSTEM DATA
Zoom Ratio: 2.90

| | Short Focal Length Extremity | Intermediate Focal Length | Long Focal Length Extremity |
|---|---|---|---|
| FNO. | 2.8 | 3.6 | 4.5 |
| f | 5.14 | 10.01 | 14.89 |
| W | 46.0 | 25.4 | 17.5 |
| Y | 4.65 | 4.65 | 4.65 |
| fB | 0.53 | 0.53 | 0.53 |
| L | 67.12 | 56.97 | 57.40 |
| d9 | 24.161 | 8.022 | 2.432 |
| d17 | 9.998 | 15.997 | 22.015 |

TABLE 23

Aspherical Surface Data (the aspherical surface coefficients not indicated are zero (0.00)):

| Surf. No. | K | A4 | A6 | A8 |
|---|---|---|---|---|
| 3 | 0.000 | −0.6151E−04 | −0.1687E−06 | −0.2832E−08 |
| 11 | 0.000 | −0.4515E−04 | −0.6491E−06 | |
| 12 | 0.000 | 0.2141E−03 | −0.3737E−05 | 0.9595E−07 |
| 16 | 0.000 | 0.3267E−03 | −0.6583E−05 | |
| 17 | 0.000 | 0.4926E−03 | 0.5546E−05 | |

TABLE 24

LENS GROUP DATA

| Lens Group | 1st Surf. | Focal Length |
|---|---|---|
| 1 | 1 | −11.76 |
| 2 | 11 | 14.50 |

Numerical Embodiment 7

Figure 37:
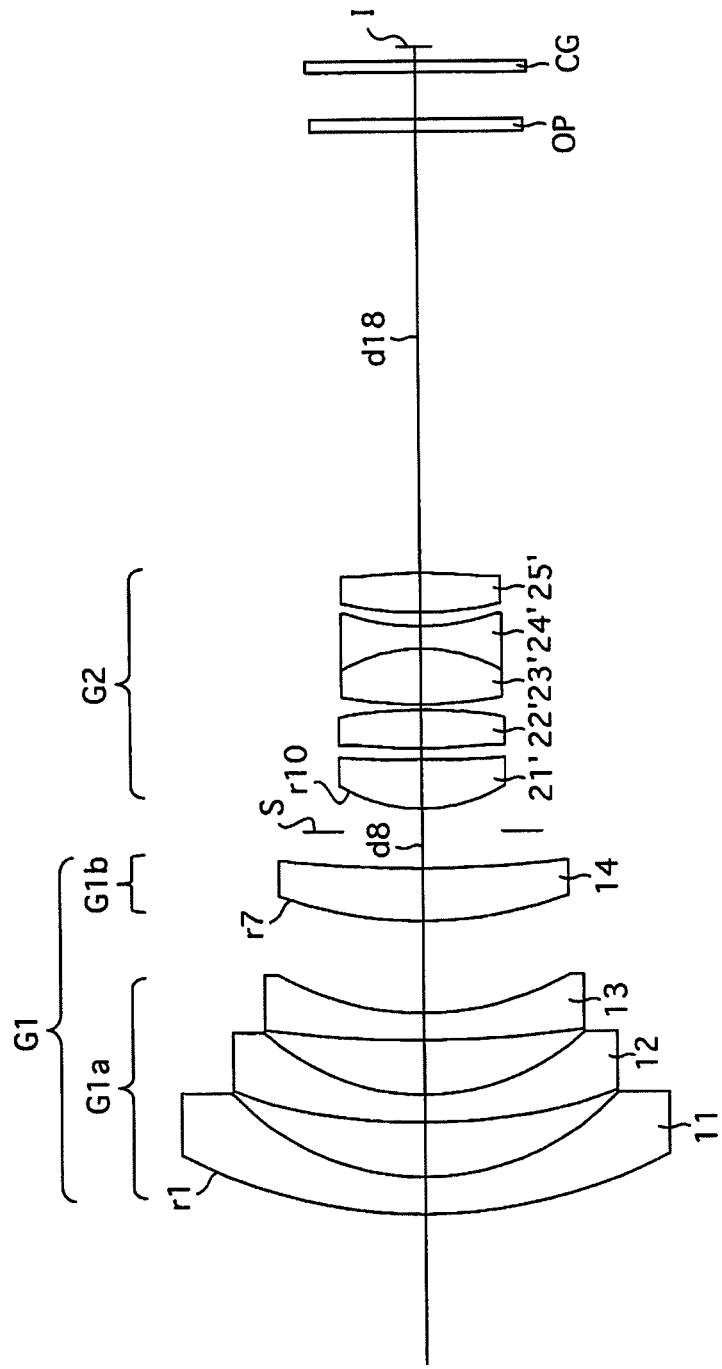
FIG. 37 shows a lens arrangement of a seventh numerical embodiment of a zoom lens system, according to the present invention, at the long focal length extremity when focused on an object at infinity.
Figure 40:
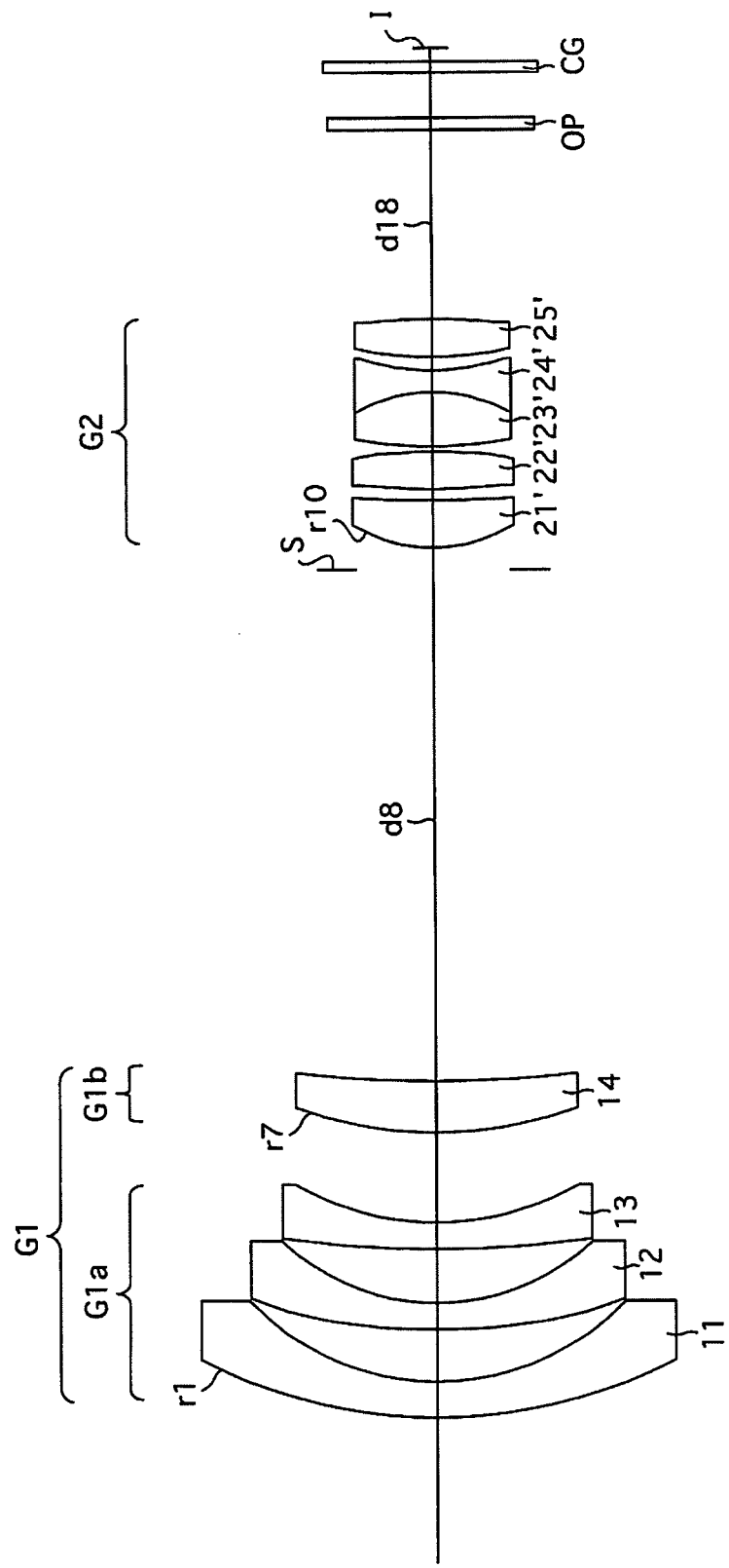
FIG. 40 shows a lens arrangement of the seventh numerical embodiment of the zoom lens system, according to the present invention, at the short focal length extremity when focused on an object at infinity.

FIGS. 37 through 42D and Tables 25 through 28 show a seventh numerical embodiment of a zoom lens system according to the present invention. FIG. 37 shows a lens arrangement of the seventh numerical embodiment of the zoom lens system at the long focal length extremity when focused on an object at infinity. FIGS. 38A, 38B, 38C and 38D show various aberrations that occurred in the lens arrangement shown in FIG. 37. FIGS. 39A, 39B, 39C and 39D show lateral aberrations that occurred in the lens arrangement shown in FIG. 37. FIG. 40 shows a lens arrangement of the seventh numerical embodiment of the zoom lens system at the short focal length extremity when focused on an object at infinity. FIGS. 41A, 41B, 41C and 41D show various aberrations that occurred in the lens arrangement shown in FIG. 40. FIGS. 42A, 42B, 42C and 42D show lateral aberrations that occurred in the lens arrangement shown in FIG. 40. Table 25 shows the lens surface data, Table 26 shows various data of the zoom lens system, Table 27 shows the aspherical surface data, and Table 28 shows various data of the lens groups according to the seventh numerical embodiment of the present invention.

The lens arrangement of the seventh numerical embodiment is the same as that of the first numerical embodiment except for the following configurations (1) through (3):

(1) The negative meniscus lens element 11 of the first sub-lens group G1a is a spherical-surfaced lens element (i.e., is not a hybrid lens).

(2) The negative lens element 12 of the first sub-lens group G1a has an aspherical surface on each side thereof.

(3) The second lens group G2 is configured of a positive meniscus lens element 21' having a convex surface on the object side, a biconvex positive lens element 22', a cemented lens having a biconvex positive lens element 23' and a biconcave negative lens element 24'; and a biconvex positive lens element 25', in that order from the object side. The biconvex positive lens element 22' and the biconvex positive lens element 25' each have an aspherical surface on each side thereof.

TABLE 25

SURFACE DATA

| Surf. No. | r | d | N(d) | ν d |
|---|---|---|---|---|
| 1 | 23.830 | 1.637 | 1.77250 | 49.6 |
| 2 | 11.916 | 2.427 | | |
| 3* | 35.080 | 1.200 | 1.75501 | 51.2 |
| 4* | 10.970 | 2.422 | | |
| 5 | 54.804 | 1.200 | 1.72916 | 54.7 |
| 6 | 13.355 | 4.078 | | |
| 7 | 19.133 | 2.326 | 1.84666 | 23.8 |
| 8 | 56.141 | d8 | | |
| 9(Diaphragm) | ∞ | 1.000 | | |
| 10 | 7.183 | 2.148 | 1.48749 | 70.4 |
| 11 | 61.161 | 0.500 | | |
| 12* | 20.601 | 1.697 | 1.49700 | 81.6 |
| 13* | −41.681 | 0.262 | | |
| 14 | 20.230 | 2.463 | 1.49700 | 81.6 |
| 15 | −7.342 | 1.000 | 1.80610 | 40.7 |
| 16 | 10.740 | 0.610 | | |
| 17* | 19.100 | 1.717 | 1.55332 | 71.7 |
| 18* | −19.802 | d18 | | |
| 19 | ∞ | 0.550 | 1.51680 | 64.2 |
| 20 | ∞ | 2.020 | | |
| 21 | ∞ | 0.500 | 1.51680 | 64.2 |
| 22 | ∞ | — | | |

The asterisk (*) designates an aspherical surface which is rotationally symmetrical with respect to the optical axis.

TABLE 26

ZOOM LENS SYSTEM DATA
Zoom Ratio: 2.89

|  | Short Focal Length Extremity | Intermediate Focal Length | Long Focal Length Extremity |
|---|---|---|---|
| FN0. | 2.8 | 4.6 | 4.5 |
| f | 5.14 | 10.01 | 14.86 |
| W | 46.5 | 25.6 | 17.6 |
| Y | 4.65 | 4.65 | 4.65 |
| fB | 0.53 | 0.53 | 0.53 |
| L | 62.04 | 51.47 | 51.41 |
| d8 | 23.214 | 7.158 | 1.625 |
| d18 | 8.541 | 14.028 | 19.494 |

TABLE 27

Aspherical Surface Data (the aspherical surface coefficients not indicated are zero (0.00)):

| Surf. No. | K | A4 | A6 | A8 |
|---|---|---|---|---|
| 3 | 0.000 | 0.6249E−04 | | |
| 4 | 0.000 | 0.3620E−04 | | |
| 12 | 0.000 | −0.5518E−03 | −0.2019E−04 | |
| 13 | 0.000 | −0.4738E−03 | −0.2935E−04 | 0.4923E−06 |
| 17 | 0.000 | 0.4300E−03 | −0.1017E−04 | |
| 18 | 0.000 | 0.8541E−03 | 0.1609E−04 | |

TABLE 28

LENS GROUP DATA

| Lens Group | 1st Surf. | Focal Length |
|---|---|---|
| 1 | 1 | −12.27 |
| 2 | 10 | 13.83 |

Numerical Embodiment 8

Figure 43:
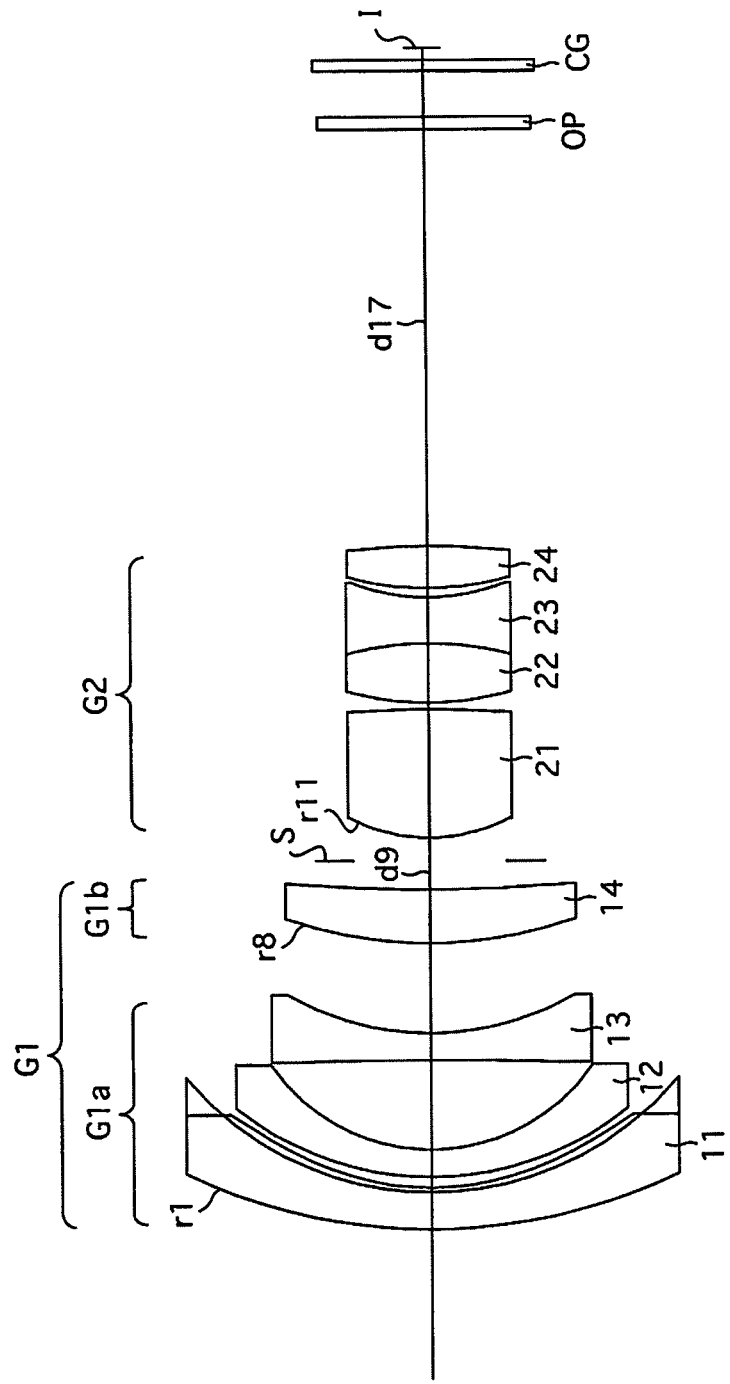
FIG. 43 shows a lens arrangement of an eighth numerical embodiment of a zoom lens system, according to the present invention, at the long focal length extremity when focused on an object at infinity.
Figures 44A, 44B, 44C, 44D:
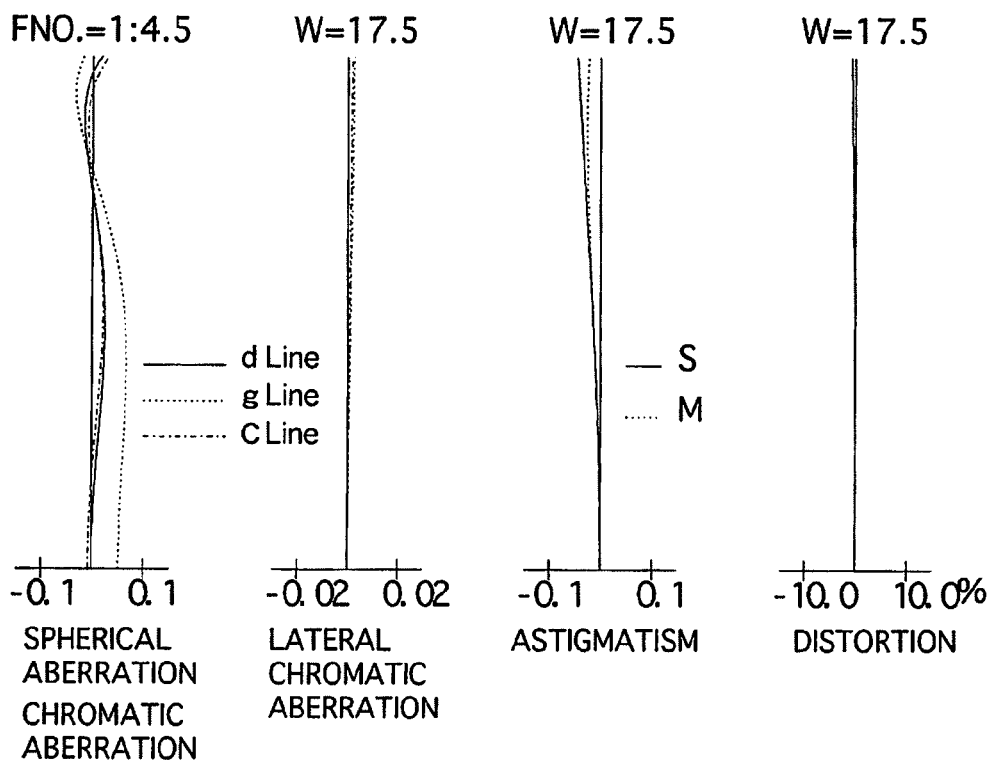
FIGS. 44A, 44B, 44C and 44D show various aberrations that occurred in the lens arrangement shown in FIG. 43.
Figure 45A:
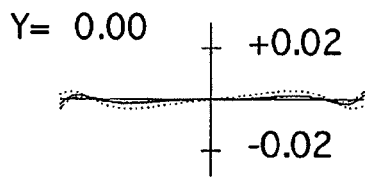
FIGS. 45A, 45B, 45C and 45D show lateral aberrations that occurred in the lens arrangement shown in FIG. 43.
Figure 45B:
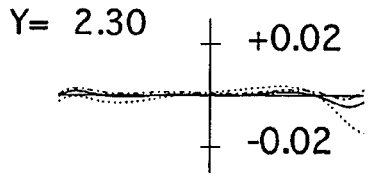
Figure 45C:
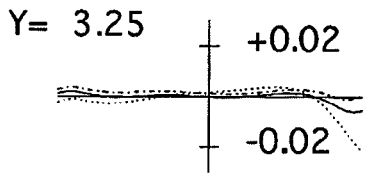
Figure 45D:
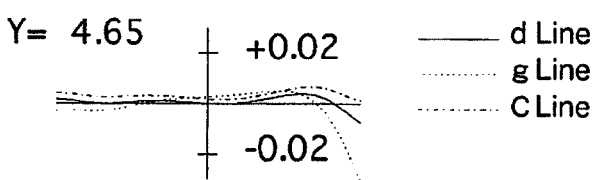
Figure 46:
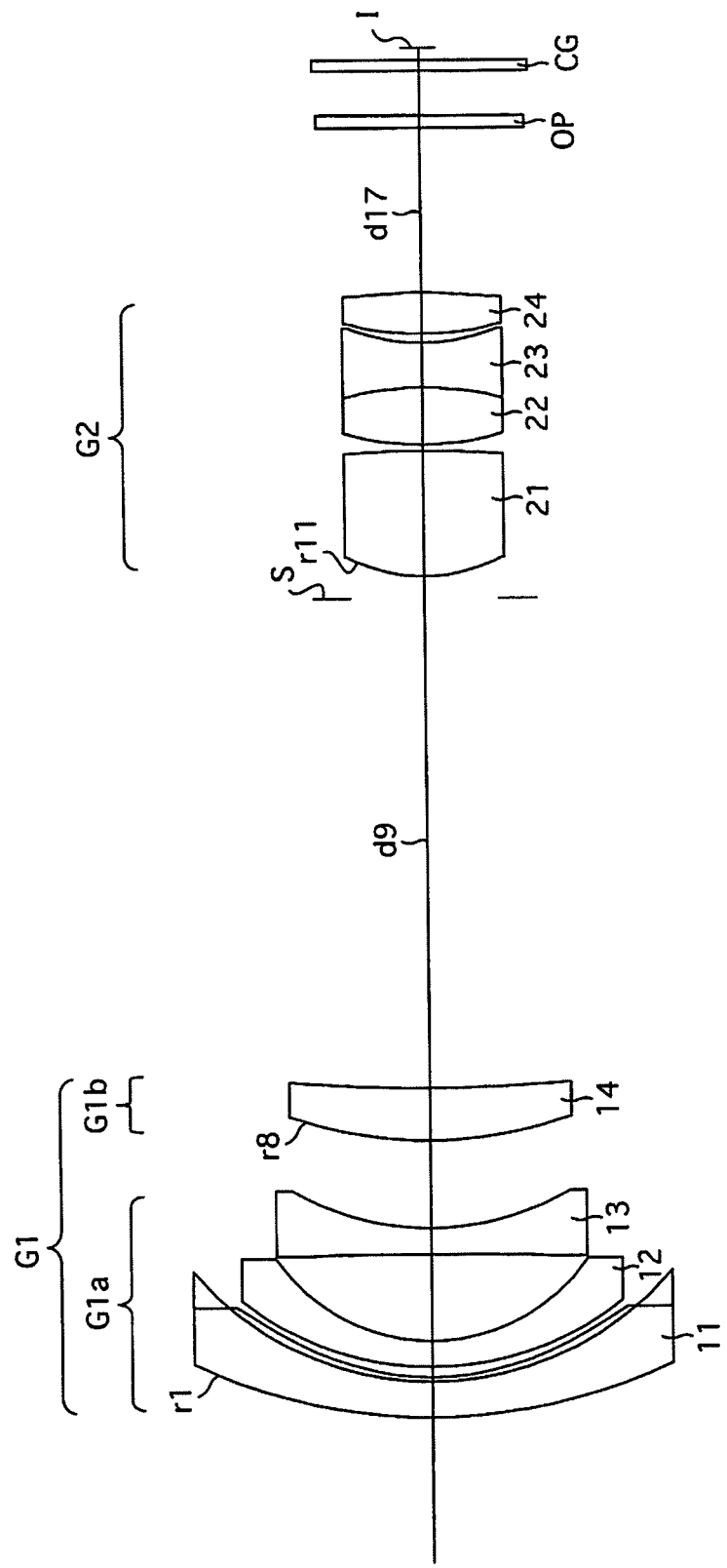
FIG. 46 shows a lens arrangement of the eighth numerical embodiment of the zoom lens system, according to the present invention, at the short focal length extremity when focused on an object at infinity.

FIGS. 43 through 48D and Tables 29 through 32 show an eighth numerical embodiment of a zoom lens system according to the present invention. FIG. 43 shows a lens arrangement of the eighth numerical embodiment of the zoom lens system at the long focal length extremity when focused on an object at infinity. FIGS. 44A, 44B, 44C and 44D show various aberrations that occurred in the lens arrangement shown in FIG. 43. FIGS. 45A, 45B, 45C and 45D show lateral aberrations that occurred in the lens arrangement shown in FIG. 43. FIG. 46 shows a lens arrangement of the eighth numerical embodiment of the zoom lens system at the short focal length extremity when focused on an object at infinity. FIGS. 47A, 47B, 47C and 47D show various aberrations that occurred in the lens arrangement shown in FIG. 46. FIGS. 48A, 48B, 48C and 48D show lateral aberrations that occurred in the lens arrangement shown in FIG. 46. Table 29 shows the lens surface data, Table 30 shows various data of the zoom lens system, Table 31 shows the aspherical surface data, and Table 32 shows various data of the lens groups according to the eighth numerical embodiment of the present invention.

The fundamental lens arrangement of the eighth numerical embodiment is the same as that of the third numerical embodiment.

TABLE 29

SURFACE DATA

| Surf. No. | r | d | N(d) | ν d |
|---|---|---|---|---|
| 1 | 25.697 | 1.637 | 1.77250 | 49.6 |
| 2 | 14.523 | 0.200 | 1.52972 | 42.7 |
| 3* | 12.085 | 0.480 | | |
| 4 | 14.171 | 1.200 | 1.80420 | 46.5 |
| 5 | 8.837 | 3.906 | | |
| 6 | −291.177 | 1.200 | 1.77250 | 49.6 |
| 7 | 12.932 | 3.973 | | |
| 8 | 19.885 | 2.370 | 1.84666 | 23.8 |
| 9 | 76.387 | d9 | | |
| 10(Diaphragm) | ∞ | 1.000 | | |
| 11* | 7.720 | 5.675 | 1.49700 | 81.6 |
| 12* | −35.514 | 0.286 | | |
| 13 | 13.352 | 2.597 | 1.49700 | 81.6 |
| 14 | −14.630 | 2.020 | 1.83400 | 37.3 |
| 15 | 9.410 | 0.413 | | |
| 16* | 15.972 | 1.856 | 1.55332 | 71.7 |
| 17* | −20.979 | d17 | | |
| 18 | ∞ | 0.550 | 1.51633 | 64.1 |
| 19 | ∞ | 2.020 | | |
| 20 | ∞ | 0.500 | 1.51633 | 64.1 |
| 21 | ∞ | — | | |

The asterisk (*) designates an aspherical surface which is rotationally symmetrical with respect to the optical axis.

TABLE 30

ZOOM LENS SYSTEM DATA
Zoom Ratio: 2.89

|  | Short Focal Length Extremity | Intermediate Focal Length | Long Focal Length Extremity |
|---|---|---|---|
| FN0. | 2.8 | 3.7 | 4.5 |
| f | 5.14 | 10.01 | 14.86 |
| W | 46.0 | 25.4 | 17.5 |
| Y | 4.65 | 4.65 | 4.65 |
| fB | 0.53 | 0.53 | 0.53 |
| L | 62.05 | 51.99 | 52.09 |
| d9 | 22.178 | 6.634 | 1.277 |
| d17 | 7.461 | 12.940 | 18.400 |

TABLE 31

Aspherical Surface Data (the aspherical surface coefficients not indicated are zero (0.00)):

| Surf. No. | K | A4 | A6 | A8 |
|---|---|---|---|---|
| 3 | 0.000 | −0.7795E−04 | −0.1683E−06 | −0.4214E−08 |
| 11 | 0.000 | −0.7397E−04 | −0.3595E−06 | |
| 12 | 0.000 | 0.3652E−03 | −0.5995E−05 | 0.2598E−06 |
| 16 | 0.000 | 0.5956E−03 | −0.1834E−04 | |
| 17 | 0.000 | 0.6814E−03 | 0.1502E−05 | |

TABLE 32

LENS GROUP DATA

| Lens Group | 1st Surf. | Focal Length |
|---|---|---|
| 1 | 1 | −12.08 |
| 2 | 11 | 13.59 |

Numerical Embodiment 9

Figure 49:
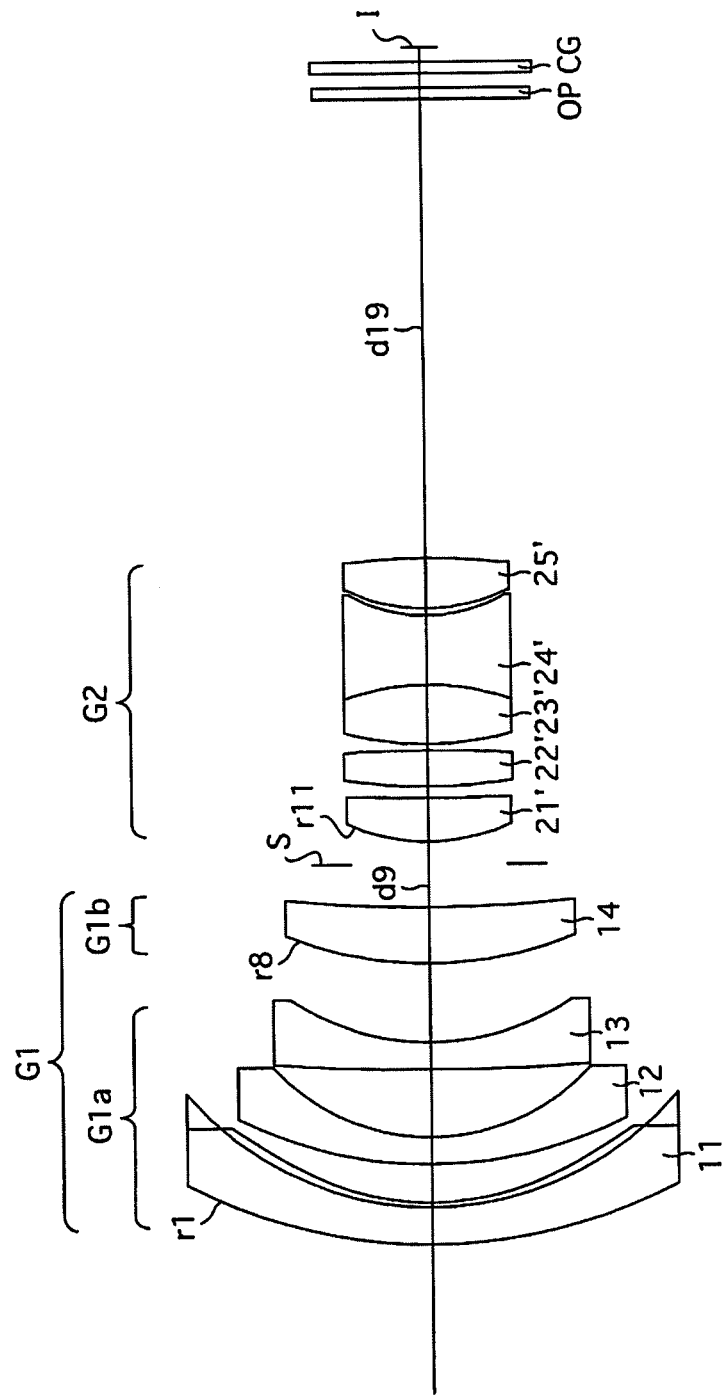
FIG. 49 shows a lens arrangement of a ninth numerical embodiment of a zoom lens system, according to the present invention, at the long focal length extremity when focused on an object at infinity.
Figure 52:
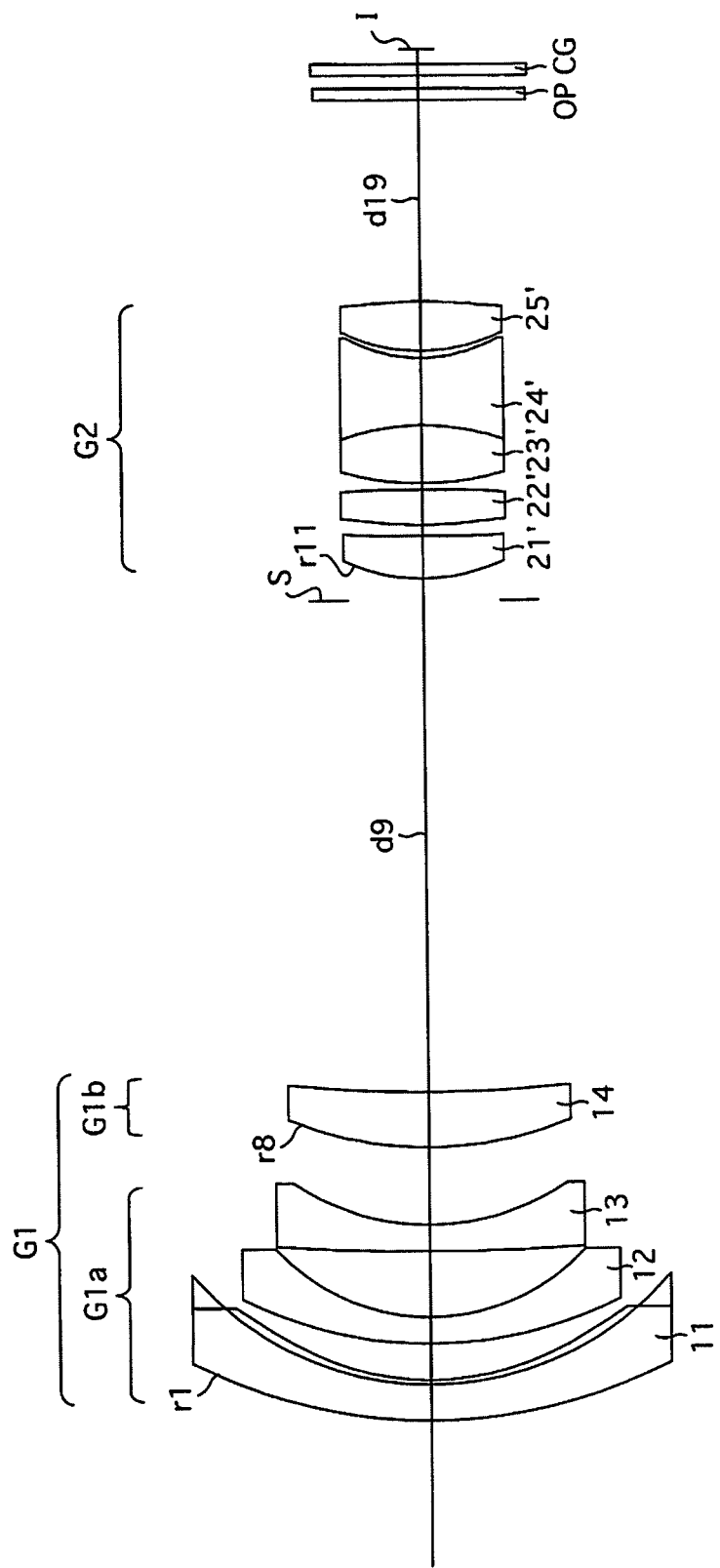
FIG. 52 shows a lens arrangement of the ninth numerical embodiment of the zoom lens system, according to the present invention, at the short focal length extremity when focused on an object at infinity.
Figures 53A, 53B, 53C, 53D:
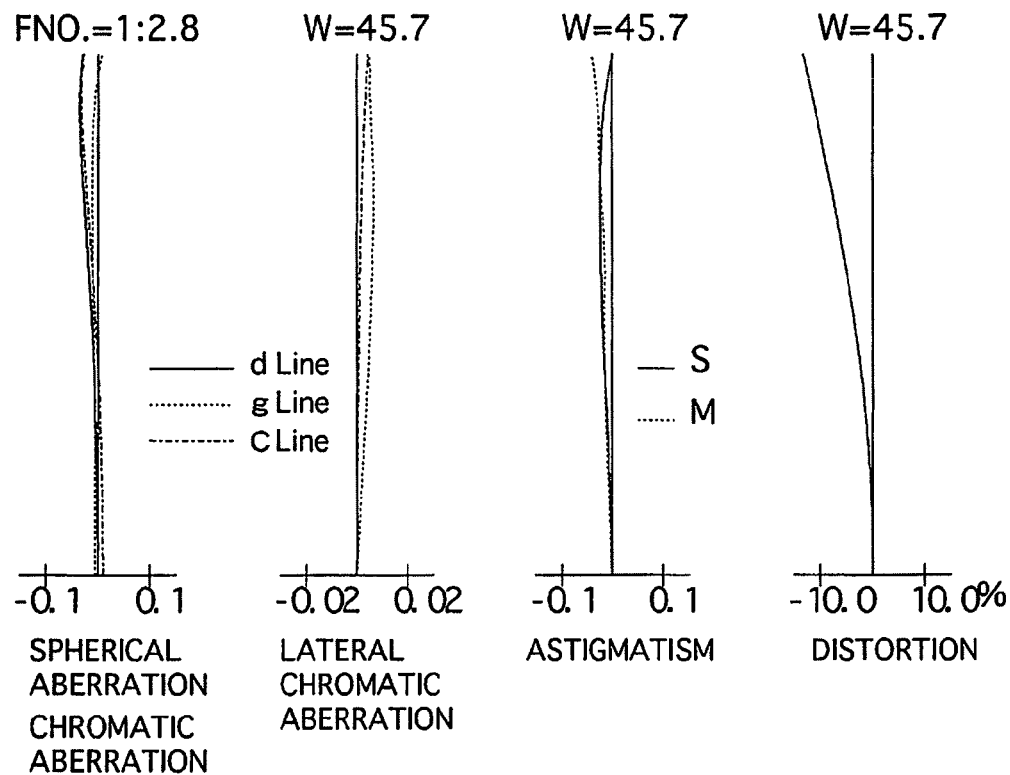
FIGS. 53A, 53B, 53C and 53D show various aberrations that occurred in the lens arrangement shown in FIG. 52.
Figure 54A:
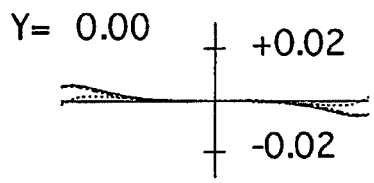
FIGS. 54A, 54B, 54C and 54D show lateral aberrations that occurred in the lens arrangement shown in FIG. 52.
Figure 54B:
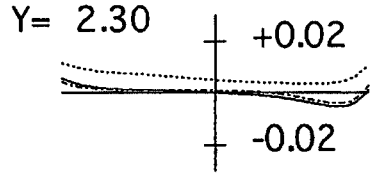
Figure 54C:
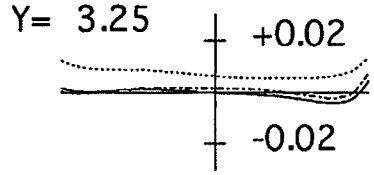
Figure 54D:
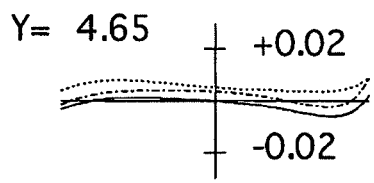

FIGS. 49 through 54D and Tables 33 through 36 show a ninth numerical embodiment of a zoom lens system according to the present invention. FIG. 49 shows a lens arrangement of the ninth numerical embodiment of the zoom lens system at the long focal length extremity when focused on an object at infinity. FIGS. 50A, 50B, 50C and 50D show various aberrations that occurred in the lens arrangement shown in FIG. 49. FIGS. 51A, 51B, 51C and 51D show lateral aberrations that occurred in the lens arrangement shown in FIG. 49. FIG. 52 shows a lens arrangement of the ninth numerical embodiment of the zoom lens system at the short focal length extremity when focused on an object at infinity. 53A, 53B, 53C and 53D show various aberrations that occurred in the lens arrangement shown in FIG. 52. FIGS. 54A, 54B, 54C and 54D show lateral aberrations that occurred in the lens arrangement shown in FIG. 52. Table 33 shows the lens surface data, Table 34 shows various data of the zoom lens system, Table 35 shows the aspherical surface data, and Table 36 shows various data of the lens groups according to the ninth numerical embodiment of the present invention.

The lens arrangement of the ninth numerical embodiment is the same as that of the first numerical embodiment except that the second lens group G2 is configured of a positive meniscus lens element 21' having a convex surface on the object side, a biconvex positive lens element 22', a cemented lens having a biconvex positive lens element 23' and a biconcave negative lens element 24'; and a biconvex positive lens element 25', in that order from the object side. The biconvex positive lens element 22' and the biconvex positive lens element 25' each have an aspherical surface on each side thereof.

TABLE 33

SURFACE DATA

| Surf. No. | r | d | N(d) | νd |
|---|---|---|---|---|
| 1 | 24.013 | 1.637 | 1.77250 | 49.6 |
| 2 | 14.571 | 0.200 | 1.52972 | 42.7 |
| 3* | 11.842 | 1.683 | | |
| 4 | 19.641 | 1.200 | 1.80420 | 46.5 |
| 5 | 9.766 | 2.985 | | |
| 6 | 118.199 | 1.200 | 1.77250 | 49.6 |
| 7 | 11.391 | 3.494 | | |
| 8 | 17.332 | 2.489 | 1.84666 | 23.8 |
| 9 | 62.012 | d9 | | |
| 10(Diaphragm) | ∞ | 1.000 | | |
| 11 | 8.814 | 1.943 | 1.48749 | 70.4 |
| 12 | 110.518 | 0.500 | | |
| 13* | 19.869 | 1.600 | 1.49700 | 81.6 |
| 14* | −135.131 | 0.292 | | |

TABLE 33-continued

SURFACE DATA

| Surf. No. | r | d | N(d) | νd |
|---|---|---|---|---|
| 15 | 14.345 | 2.602 | 1.49700 | 81.6 |
| 16 | −11.350 | 3.048 | 1.80610 | 40.7 |
| 17 | 7.191 | 0.312 | | |
| 18* | 8.878 | 2.224 | 1.55332 | 71.7 |
| 19* | −20.499 | d19 | | |
| 20 | ∞ | 0.500 | 1.51633 | 64.1 |
| 21 | ∞ | 0.620 | | |
| 22 | ∞ | 0.500 | 1.51633 | 64.1 |
| 23 | ∞ | — | | |

The asterisk (*) designates an aspherical surface which is rotationally symmetrical with respect to the optical axis.

TABLE 34

ZOOM LENS SYSTEM DATA
Zoom Ratio: 2.88

| | Short Focal Length Extremity | Intermediate Focal Length | Long Focal Length Extremity |
|---|---|---|---|
| FNO. | 2.8 | 3.6 | 4.5 |
| f | 5.14 | 10.00 | 14.81 |
| W | 45.7 | 25.3 | 17.5 |
| Y | 4.65 | 4.65 | 4.65 |
| fB | 0.53 | 0.53 | 0.53 |
| L | 62.01 | 52.41 | 52.72 |
| d9 | 22.329 | 7.129 | 1.913 |
| d19 | 9.127 | 14.721 | 20.252 |

TABLE 35

Aspherical Surface Data (the aspherical surface coefficients not indicated are zero (0.00)):

| Surf. No. | K | A4 | A6 | A8 |
|---|---|---|---|---|
| 3 | 0.000 | −0.7476E−04 | −0.1420E−06 | −0.5522E−08 |
| 13 | 0.000 | −0.2224E−03 | −0.8780E−05 | |
| 14 | 0.000 | −0.1259E−03 | −0.1301E−04 | 0.1531E−06 |
| 18 | 0.000 | 0.3293E−03 | −0.1557E−05 | |
| 19 | 0.000 | 0.5540E−03 | 0.1037E−04 | |

TABLE 36

LENS GROUP DATA

| Lens Group | 1$^{st}$ Surf. | Focal Length |
|---|---|---|
| 1 | 1 | −11.82 |
| 2 | 11 | 13.60 |

The numerical values of each condition for each embodiment are shown in Table 37.

TABLE 37

| | Embod. 1 | Embod. 2 | Embod. 3 | Embod. 4 | Embod. 5 | Embod. 6 | Embod. 7 | Embod. 8 | Embod. 9 |
|---|---|---|---|---|---|---|---|---|---|
| Cond. (1) | −0.47 | −0.62 | −0.71 | −0.47 | −0.60 | −0.79 | −0.49 | −0.59 | −0.56 |
| Cond. (2) | −4.84 | −3.72 | −3.59 | −4.82 | −3.94 | −3.91 | −4.47 | −4.31 | −4.03 |
| Cond. (3) | −1.58 | −3.00 | −3.41 | −1.17 | −2.16 | −3.21 | −1.43 | −1.53 | −1.79 |

As can be understood from Table 37, the first through ninth embodiments satisfy conditions (1) through (3). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group and a positive second lens group, in that order from an object side, wherein upon zooming from a short focal length extremity of the zoom lens system to a long focal length extremity of the zoom lens system, said first lens group and said second lens group move in an optical axis direction while the distance therebetween mutually decreases, wherein said first lens group consists of a negative lens element, a negative lens element, a negative lens element, and a positive lens element, in that order from the object side;

wherein said first lens group comprises a negative first sub-lens group and a positive second sub-lens group, in that order from the object side, wherein said second sub-lens group constitutes a focusing lens group that is moved in the optical axis direction during a focusing operation, wherein said second sub-lens group comprises a positive single lens element, wherein the following condition (1) is satisfied:

$$-0.79 \leq SF \leq -0.47 \quad (1),$$

wherein

SF=(br1−br2)/(br1+br2), br1 designates the radius of curvature of the surface on the object side of said positive single lens element of said second sub-lens group, and br2 designates the radius of curvature of the surface on an image side of said positive single lens element of said second sub-lens group, wherein the following condition (2) is satisfied:

$$-4.84 \leq f1b/f1a \leq -3.59 \quad (2),$$

wherein f1b designates the focal length of said second sub-lens group, and f1a designates the focal length of said first sub-lens group, wherein said first sub-lens group comprises three negative lens elements which each has a concave surface on the image side, and wherein the following condition (3) is satisfied:

$$-3.5 < fL1/(fL2 \cdot fL3)^{1/2} \leq -1.17 \quad (3),$$

wherein fL1 designates the focal length of the first negative lens element that is provided within said first sub-lens group, in that order from the object side, fL2 designates the focal length of the second negative lens element that is provided within said first sub-lens group, in that order from the object side, and fL3 designates the focal length of the third negative lens element that is provided within said first sub-lens group, in that order from the object side.

2. The zoom lens system according to claim 1, wherein an aspherical surface is provided on at least one of said three negative lens elements of said first sub-lens group.

3. The zoom lens system according to claim 1, wherein at least one aspherical-surfaced lens element is provided in each of said first lens group and said second lens group.

4. The zoom lens system according to claim 1, wherein said second lens group comprises at least three positive lens elements.

5. The zoom lens system according to claim 1, wherein the air-distance between said first sub-lens group and said second sub-lens group remains unchanged during zooming from the short focal length extremity to the long focal length extremity.

6. The zoom lens system according to claim 1, wherein a diaphragm is provided between said first lens group and said second lens group.

7. An optical instrument comprising an image sensor that electronically converts an image that is formed through the zoom lens system according to claim 1 into a signal.

8. The zoom lens system according to claim 2, wherein the negative lens element that is provided closest to the object side within said first sub-lens group is a hybrid comprising a glass lens element having a compound resin layer bonded to the image side thereof.

9. The zoom lens system according to claim 2, wherein an aspherical surface is provided on the second negative lens element that is provided within said first sub-lens group, in that order from the object side.

* * * * *